US012718498B2

(12) United States Patent
Lal et al.

(10) Patent No.: US 12,718,498 B2
(45) Date of Patent: Aug. 25, 2026

(54) SYSTEMS AND METHODS FOR IMPORTING CONTENT ON A DISPLAY SCREEN INTO AN EXTENDED REALITY ENVIRONMENT

(71) Applicant: Adeia Guides Inc., San Jose, CA (US)

(72) Inventors: Dhananjay Lal, Englewood, CO (US); Serhad Doken, Bryn Mawr, PA (US); Ning Xu, Irvine, CA (US); Jean-Yves Couleaud, Mission Viejo, CA (US)

(73) Assignee: Adeia Guides Inc., San Jose, CA (US)

( * ) Notice: Subject to any disclaimer, the term of this patent is extended or adjusted under 35 U.S.C. 154(b) by 113 days.

(21) Appl. No.: 18/621,377

(22) Filed: Mar. 29, 2024

(65) Prior Publication Data

US 2025/0308171 A1 Oct. 2, 2025

(51) Int. Cl.
*G06T 19/00* (2011.01)
*G06V 30/10* (2022.01)

(52) U.S. Cl.
CPC ............ *G06T 19/006* (2013.01); *G06V 30/10* (2022.01)

(58) Field of Classification Search
CPC .... G06T 19/006; G06V 30/10; G02B 27/017; G06F 3/011
See application file for complete search history.

(56) References Cited

U.S. PATENT DOCUMENTS

2022/0187983 A1* 6/2022 Singh .................... G06F 3/0484
2023/0229381 A1* 7/2023 Mak ..................... G06V 10/235 345/633
2024/0296005 A1* 9/2024 Pinon ...................... G06F 3/147

FOREIGN PATENT DOCUMENTS

JP 2022098268 A * 7/2022 ......... G02B 27/0172
WO WO-2019199569 A1 * 10/2019 ......... G06F 3/04815

OTHER PUBLICATIONS

AWS, What is OCR (Optical Character Recognition)?, available online at: <What is OCR (https://aws.amazon.com/what-is/ocr/>, retrieved on Jul. 8, 2024, 9 pages.
Developer, "Discover visionOS", available online at: <https://developer.apple.com/visionos/>, retrieved on Jul. 8, 2024, 6 pages.
Kasturi, R., et al., "Document image analysis: A primer", Sadhana, vol. 27, Feb. 2002, pp. 3-22.

(Continued)

*Primary Examiner* — Chante E Harrison
(74) *Attorney, Agent, or Firm* — HG LAW LLP

(57) ABSTRACT

Systems and methods are provided for importing content into an extended reality environment from the display screen of a display device. An extended reality display is connected to an extended reality environment. Instructions are received to import plurality of device content elements from a display screen of a display device into the extended reality environment, the content elements being displayed in a scrollable field on the display screen. An image sensor captures content images of the display screen while the scrollable field is scrolled to display the plurality of device content elements. The captured content images are analyzed to identify extended reality content elements, each extended reality content element corresponding to one of the device content elements. The extended reality content elements are displayed within the extended reality environment using the extended reality display.

20 Claims, 14 Drawing Sheets

(56) References Cited

OTHER PUBLICATIONS

Mageswaran D, “Text Information Extraction”, Medium, available online in <https://mageswaran1989.medium.com/text-information-extraction-9820a4a527f4>, Jul. 15, 2019, 19 pages.
Projection Profile method, available online at: <https://www.geeksforgeeks.org/projection-profile-method/>, Jun. 25, 2019, 9 pages.
Wikipedia, Optical character recognition, available online at: <https://en.wikipedia.org/wiki/Optical_character_recognition>, retrieved on Jul. 8, 2024, 8 pages.
XREAL, Nebula is XREAL’s proprietary software that provides an operating environment for AR apps built with the XREAL SDK. It is also a testbed for breeding new ideas and innovation., available online at: <https://www.xreal.com/app/>, Jul. 8, 2024, 3 pages.
“Iamage Segmentation: the Basics and 5 Key Techniques,” available online at: <https://web.archive.org/web/20231004071837/http://datagen.tech/guides/image-annotation/image-segmentation/>, retrieved on Aug. 12, 2024.

* cited by examiner

Horror

H1 H2 H3 H4
H5 H6 H7 H8
H9 H10 H11 H12
H13 H14 H15 H16

410 408

Movie Maestro

My List
L1 L2 L3

Comedy
C1 C2 C3

Horror
H1 H2 H3 H4 H5 ... H16

602 Capture first image of device display screen

604 Capture next image of device display screen

606 Determine overlap between two successive captured images

608 Calculate overlap metric

610 Is overlap metric > upper threshold ?

Yes

612 Increase image capture rate

No

614 Is overlap metric < lower threshold ?

No

Yes

616 Is overlap metric = 0 ?

No

618 Reduce image capture rate

Yes

620 Present error message and instruct user to re-initiate scroll mode

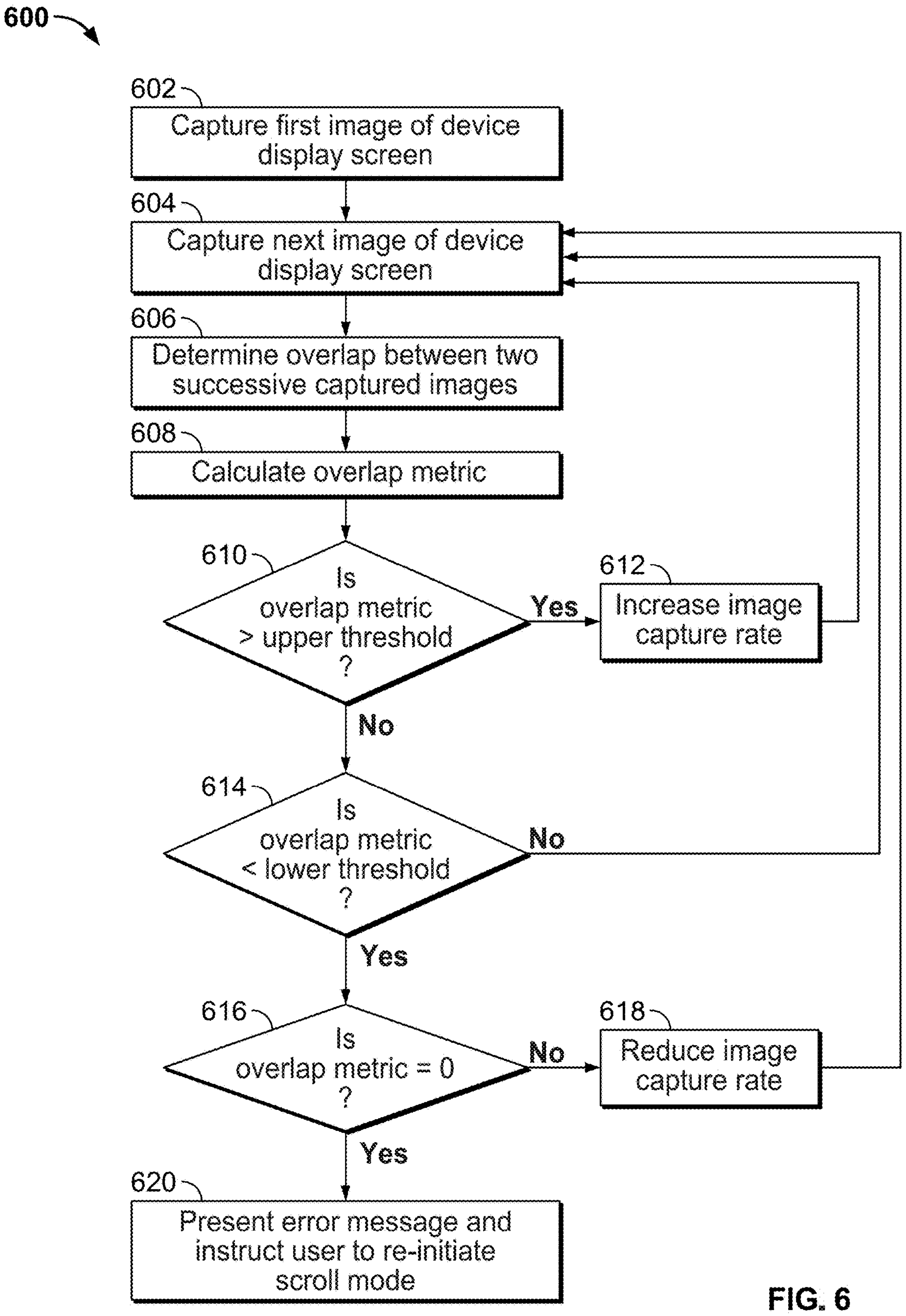

FIG. 6

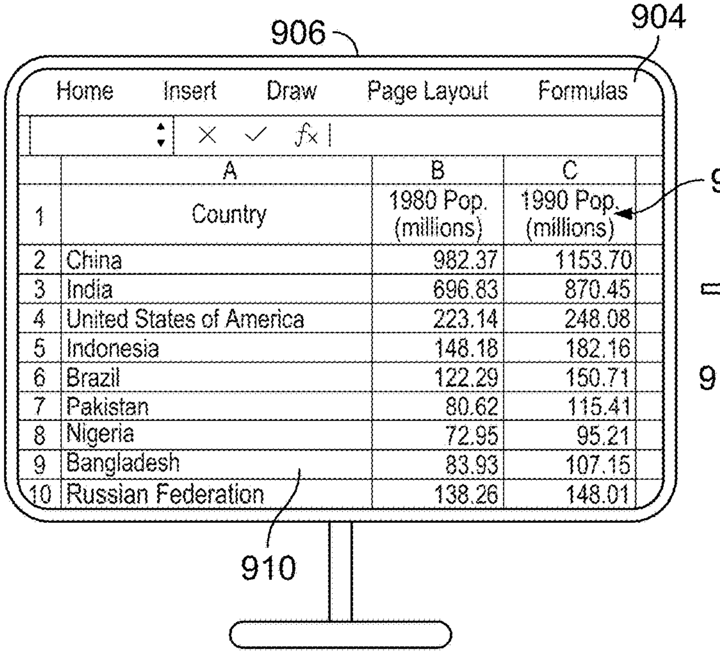

908

912

| | A | B | C | D |
|---|---|---|---|---|
| 1 | Country | 1980 Pop. (millions) | 1990 Pop. (millions) | 2000 Pop. (millions) |
| 2 | China | 982.37 | 1153.70 | 1264.10 |
| 3 | India | 696.83 | 870.45 | 1059.63 |
| 4 | United States of America | 223.14 | 248.08 | 282.40 |
| 5 | Indonesia | 148.18 | 182.16 | 214.07 |
| 6 | Brazil | 122.29 | 150.71 | 175.87 |
| 7 | Pakistan | 80.62 | 115.41 | 154.37 |
| 8 | Nigeria | 72.95 | 95.21 | 122.85 |
| 9 | Bangladesh | 83.93 | 107.15 | 129.19 |
| 10 | Russian Federation | 138.26 | 148.01 | 146.84 |
| 11 | Japan | 117.62 | 123.69 | 126.80 |
| 12 | Mexico | 67.71 | 81.72 | 97.87 |
| 13 | Philippines | 48.42 | 61.56 | 77.96 |
| 14 | Ethiopia | 34.95 | 47.88 | 67.03 |
| 15 | Viet Nam | 52.97 | 66.91 | 79.00 |
| 16 | Egypt | 43.75 | 57.21 | 71.37 |
| 17 | Germany | 77.79 | 79.37 | 81.55 |
| 18 | Iran | 38.52 | 55.79 | 65.54 |
| 19 | Turkey | 44.09 | 54.32 | 64.11 |
| 20 | Thailand | 45.74 | 55.23 | 63.07 |
| 21 | D.R. Congo | 26.71 | 35.99 | 48.62 |
| 22 | United Kingdom | 56.33 | 57.21 | 58.85 |
| 23 | France | 53.71 | 56.41 | 58.67 |
| 24 | Italy | 56.33 | 56.76 | 56.97 |
| 25 | South Africa | 29.46 | 39.88 | 46.81 |
| 26 | Myanmar | 33.47 | 40.10 | 45.54 |
| 27 | Republic of Korea | 38.17 | 44.12 | 46.79 |
| 28 | Spain | 37.49 | 38.89 | 40.74 |
| 29 | Ukraine | 49.97 | 51.59 | 48.88 |
| 30 | Tanzania | 19.30 | 26.21 | 34.46 |
| 31 | Colombia | 26.18 | 32.60 | 39.22 |
| 32 | Kenya | 16.19 | 23.16 | 30.85 |
| 33 | Argentina | 28.02 | 32.64 | 37.07 |
| 34 | Poland | 35.52 | 38.06 | 38.50 |
| 35 | Algeria | 18.74 | 25.52 | 30.77 |
| 36 | Canada | 24.51 | 27.66 | 30.68 |
| 37 | Sudan | 16.67 | 21.09 | 26.30 |
| 38 | Morocco | 19.68 | 24.57 | 28.55 |

FIG. 9

SYSTEMS AND METHODS FOR IMPORTING CONTENT ON A DISPLAY SCREEN INTO AN EXTENDED REALITY ENVIRONMENT

BACKGROUND

This disclosure is generally directed to systems and methods for importing content displayed on a display screen of a display device into an extended reality (XR) environment and arranging the imported content on an XR display for viewing and manipulation. In particular, the content may be imported into the XR environment directly from the display screen without establishing a direct communication path between the display device and the XR framework supporting the XR environment.

SUMMARY

In today's digitally connected world, users frequently encounter large menus, lists, grids, and other similar groupings of content elements on other display devices separate from the XR display. Such other devices may be personal devices (e.g., smartphones, tablet computers, laptop and desktop computers, smart TVs, etc.), ticker displays, airplane flight status displays, roadside displays, interactive kiosk displays, and digital billboard displays, and other types of personal and/or public displays. The content elements may be, for example, a menu of many of selectable actions, search results from a search engine, multi-media content, a list of restaurants, product or services reviews, a spreadsheet, and social media comments, among many other content element types. One of the difficulties that a user may encounter when trying to view a large group of content elements on a display device occurs when the large group of content elements cannot all be displayed on the display device at the same time. Typically, this occurs for the simple reason that the group is too large to be legibly displayed based on the limited size of the display screen of most display devices. In such instances, the content elements may be presented in a scrollable field which the user may scroll through to view more than just the few content elements that are displayed at any given moment.

While the scrollable field functions to enable the user to view the entirety of the group of content elements on a display screen of limited size, it does present certain limitations. The most significant shortcoming is the inability of the user to view all content elements in the scrollable field at the same time. Another shortcoming is that the content elements in some scrollable fields may not be sorted by the user to change the order of arrangement. In scrollable fields that do offer sorting the sorting capabilities are typically limited, and therefore of limited use to the user. For some display devices, one or more of these shortcomings may be solved by importing the content elements from the scrollable field into an extended reality (XR) environment to be viewed using an XR display having a larger viewable display area than the display device. By way of example, the effective viewing size of an XR head-mounted display can be substantially larger than the display of a large screen smart TV. Yet importing content elements into an XR environment can be challenging because the display device, or in some instances each application on the display device, is typically required to have direct communication with the XR environment. When such direct communication is not readily established, the user typically cannot use an XR environment for enhanced viewing of large groups of content elements.

A need therefore exists to improve the process of importing groups of content elements into an XR environment when direct communication between a display device, where the group of content elements initially exists for the user, and the XR environment is unavailable. To overcome such shortcomings, systems and methods that import content elements into an XR environment directly from the display screen of the display device may be employed. The ability to import content elements into the XR environment without direct communication between the XR environment and the display device presents an important advantage of systems and methods described herein. In such systems and methods, an image sensor associated with an XR display or XR device may capture images of the content elements on the display screen of the display device as a scrollable field containing the content elements is scrolled. During (or following) capture of the content elements, the XR framework supporting the XR environment may analyze the content elements to distinguish between and identify common features amongst the content elements. The XR framework may also assign data values to the identified common features for each content element, and the assigned data values may be used to assist the user in sorting, organizing, and reviewing the content elements.

Following importation of the content elements into the XR environment, important advantages are realized to the benefit of the user. For example, the imported content elements may be displayed to the user, within the XR environment using the XR display, with many more (and potentially all) of the imported content elements being displayed for the user to view simultaneously. In addition, the imported content elements may be much more sortable within the XR environment due to the analysis and assignment of data values to the common features of the content elements that is performed during importation. As another advantage, the imported content elements may be displayed within the XR environment in a different arrangement (as compared to the arrangement of the content elements on the display screen) to enhance the user's ability to view and mentally process the content. Also, if the group of content elements is presented to the user for purposes of the user identifying one of the content elements for selection, once the user makes the identification, the XR environment may guide the user through the scrollable field on the display device so that the user may then select the identified content element on the display device itself. With these advantages and other aspects of the described systems and methods herein, content may be imported into an XR environment directly from the display screen of a display device, and the imported content may be displayed on the XR display so that the user may interact with the imported content within the XR environment using the large-format display of an XR display.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale. The figures include:

FIG. 6 shows a flowchart of illustrative steps involved in analyzing device content elements imported into an AR environment;

FIG. 9 graphically illustrates the AR environment importing and altering sort order arrangement of content elements imported as a spreadsheet;

DETAILED DESCRIPTION

Figure 1:
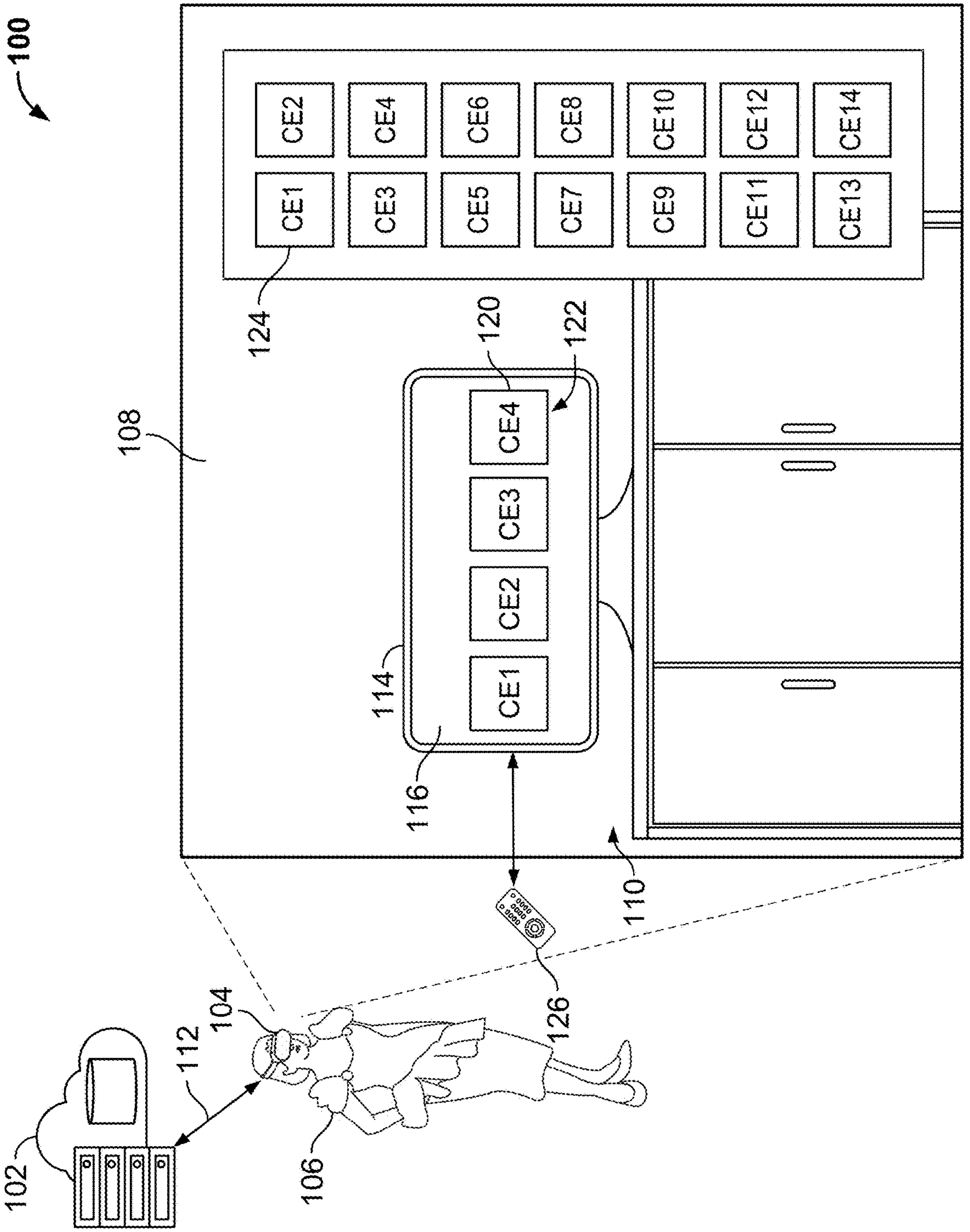
FIG. 1 shows an exemplary environment in which an XR framework communicates with an AR head-mounted display to import content elements from a display device into an AR environment in accordance with some embodiments of this disclosure.

Systems and methods are described herein for an XR framework that supports presenting an XR environment to a user on an XR display. In particular, the XR display presents the XR environment to a user and enables the user to import content elements displayed on a display device into the XR environment without the display device and the XR environment being in direct communication.

While the systems and methods described herein are in the context of importing content from a user device, which is a type of display device that includes a display screen, into an AR environment using an AR head-mounted display, the disclosed systems and methods are intended to be non-limiting and may be applicable within other contexts. For example, content may be imported from a smaller display device, such as a smartphone, into an AR environment using an image sensor associated with an AR display of a larger display device, such as a smart TV. For example, content may be imported from a display device into an MR environment using an MR display. For example, content may be imported from a display device into a VR environment using a VR head-mounted display that may be switched between AR mode or MR mode that enable viewing of the user's surrounding real-world environment during content import and a VR mode for viewing the imported content. For example, content may be imported from a public display device having a display screen (e.g., a ticker display device, a flight status display device, a kiosk display device, and the like) into an AR environment using a smartphone and using the smartphone display as the AR display. The examples described herein using an AR environment and an AR display are therefore illustrative, and the described systems and processes may be extended to include the importation of content into an MR environment or into a VR environment through associated MR and/or VR user equipment.

As referred to herein, the term "content" and its variants (e.g., "content element") should be understood to mean an electronically consumable asset that may be accessed using any suitable electronic platform, such as broadcast television, pay-per-view, on-demand media (as in video-on-demand (VOD) systems), network-accessible media (e.g., streaming media, downloadable media, Webcasts, etc.), video clips, audio, haptic feedback, information about media, images, animations, documents, playlists, websites and webpages, articles, books, electronic books, blogs, chat sessions, social media, software applications, data, games, virtual reality media, extended reality media, and/or any other media or multimedia and/or any combination thereof. Extended reality (XR) content, which is a particular type of content, refers to augmented reality (AR) content, virtual reality (VR) content, hybrid or mixed reality (MR) content, and/or other digital content combined therewith to mirror physical-world objects or to be otherwise viewed or interacted with in an XR environment.

As described herein, the term "XR environment" and its variants refer to an artificial, interactive, digitally generated information, media, scene, or world and include immersive media and/or 4D content. As described herein, the term "virtual space" and its variants refer to a space having defined bounds in an XR environment. The virtual space (and thus also portions of the XR environment) may be presented to a user as an overlay environment on a real-world scene (e.g., augmented reality), as a stand-alone environment (e.g., virtual reality), or as a combination thereof (e.g., hybrid or mixed reality). In each, the virtual space may include models, avatars, and/or other virtual representations of physical objects with which the user of an XR display may engage, communicate, and interact, among other activities. As described herein, the terms "virtual bridge" or "bridge" refer to a communication path that has at least one virtual component (e.g., a connection facilitated within the virtual environment) and may include one or more non-virtual components and/or networks, the virtual bridge communicably coupling two or more devices. A communication path including a virtual bridge may be referred to as a virtual connection and/or a virtual network. As described herein, the terms "communication link" or "link" and variants thereof refer to a communication path, including both wired and RF-based connections, that communicably couples two or more devices and includes one or more non-virtual components and/or networks without the use of any virtual components (e.g., a virtual bridge).

As described herein, an XR framework may include hardware, software, firmware, and/or any combinations of components thereof, where any of the involved systems may perform one or more of actions of the described techniques without departing from the teachings of the present disclosure. It is noted and appreciated that reference to an XR framework is provided for conciseness and may refer to one or more parts of the XR framework, and combinations thereof, that performs the described actions. Some non-limiting examples are described as follows. For example, an XR framework may include a locally hosted application at an XR user device (e.g., an XR head-mounted display). For example, an XR framework may include a virtual network between various devices. For example, an XR framework may include a remote application such as an XR environment system hosted at a server communicatively coupled to one or more user devices and other systems linked to a user device, where the XR environment system provides instructions that are transmitted to the user devices and executed by the relevant systems at the respective locations of the user devices. For example, an XR framework may include a subsystem integrated with user equipment. For example, an XR framework may include a local application hosted at user equipment and a remote system communicatively coupled therewith.

As disclosed herein, systems and methods are provided for importing content from a user device and into an XR environment. The content may be in the form of a group of similar or loosely related content elements. Moreover, each content element may include context elements which provide additional information (e.g., a short description, price information, rating information, etc.) to the user about the respective content element. The content, and content elements, may be displayed on a user device having a small or limited display screen as, for example, a menu of many of selectable actions and/or functions, player controls of a game, search results from a search engine, multi-media content, a list of restaurants, product or services reviews, a spreadsheet, and social media comments, among many other types of content and content elements, and the nature of the content displayed on the user device is intended to be non-limiting. As used herein, when a content element is displayed on a user device, it may be referred to as a "device content element," and when a content element is displayed within an XR environment, it may be referred to as an "XR content element," an "AR content element", and variants thereof. When a content element is referenced in the abstract without further context, it may be referred to simply as a "content element."

Turning in detail to the drawings, FIG. 1 shows an example scenario 100 of an XR framework 102 communicating with an AR head-mounted display 104 to enable a user 106 to view and have interactive access with a virtual space 108 within an AR environment. As discussed further below, the AR head-mounted display 104 includes an AR display for presenting the virtual space 108 to the user of the AR head-mounted display 104, with the virtual space 108 appearing overlaid on the user's surrounding environment to create the AR environment for the user. Also, the AR head-mounted display 104 includes an image sensor which provides the AR head-mounted display 104 and the XR framework 102 with images of the real-world scene 110 so that the virtual space 108 may include AR data and display the AR data on the AR display as requested or needed by the user 106. The XR framework 102 and the AR head-mounted display 104 communicate with each other through the communication path 112 in support of the AR head-mounted display 104 displaying the virtual space 108 on the AR display. The communication path 112 (and any other communication path identified herein) may include a plurality of paths, networks, intervening nodes, edge servers, etc. Further, the communication path is described herein as single path for conciseness, and this description is intended to be non-limiting. The XR framework 102 and the communication path 112 may have various configurations and/or combinations of hardware, software, firmware, etc., suitable for performing the functions described herein without departing from the teachings of the present disclosure.

The XR framework 102 may generate the virtual space 108 within the AR environment to virtually display to the user 106 information, media content, and other types of data, that are related to the real-world scene 110 present within the user's view. The type of information, media content, and data presented to the user within the virtual space 108 is intended to be non-limiting. In embodiments in which the AR environment is instead an XR environment or an MR environment, the virtual space may also include virtual objects, virtual scenery, and user avatars, among other types of virtual representations. In this scenario 100, from the perspective of the user 106, the virtual space 108 is overlaid against the real-world scene 110. As shown, the real-world scene 110 includes, among other real-world objects, a display device 114 (shown as a smart TV) having a display screen 116 displaying device content elements 120 within a scrollable field 122. In this scenario 100, the device content elements 120 are schematically shown and may include thumbnail images representing movies that may be selected for viewing by the user 106. For purposes of clarity in this scenario 100, only the single scrollable field 122 is shown on the display device 114, and four device content elements 120, labeled CE1-CE4, are visible on the display device 114, although scrollable field includes a total of fourteen device content elements 120.

In some alternative scenarios, multiple scrollable fields of different genres of movies may be presented to the user. For example, when a user is perusing a multimedia application on a user device with the intent of consuming a movie, thumbnail images representing a significant number of movies, categorized by genre or by other groupings, may be presented to the user in multiple scrollable fields.

In some embodiments, the display device 114 may be other than a smart TV, such as a smartphone, a tablet computer, a laptop or a desktop computer, an in-car navigation computing system, and other types of display devices, which may include ticker displays, airplane flight status displays, roadside displays, interactive kiosk displays, and digital billboard displays, among others. The form factor of the display device 114 is intended to be non-limiting.

As shown in the scenario 100, the display device 114 does not display the entire group of device content elements 120 on the display screen 116 at the same time. Attempting to display the entire group of device content elements 120 on the display screen 116 at the same time may render the device content elements 120 illegible to the user 106. The user 106 thus needs to interact with and scroll the scrollable field 122 using a remote control 126 that is paired with the display device 114 to view more of the device content elements 120 on the display screen while selecting a movie for viewing. However, by importing the device content elements 120 into the AR environment for viewing in the virtual space 108, some of the hassle of scrolling may be eliminated while the user decides upon and selects a movie for viewing. For simplification, in this scenario 100 the display device 114 is shown displaying a single genre of movies as device content elements 120 in a single scrollable field 122 on the display screen 116. In other scenarios, the display screen 116 may display multiple genres of movies as content elements in multiple scrollable fields, and the AR head-mounted display 104 may be used to import content elements from only one of the scrollable fields when multiple scrollable fields are present. In some scenarios, the content elements from multiple scrollable fields may be imported. In some scenarios, the scrollable field may scroll without interaction between the user and the display device 114. Such scenarios may include display devices that are public devices, such as stock ticker devices, flight status devices, and the like.

In this scenario 100, the scrollable field 122 may include many device content elements in the scrollable field 122, with a definite first device content element and a definite last device content element within the scrollable field 122. Thus, the user 106 may scroll through the scrollable field 122 from the first device content element to the last device content element, while viewing all the device content elements in between. In some scenarios, the scrollable field 122 may be a wraparound or carousel scrollable field (also referred to as a carousel), such that when the user 106 scrolls to display the last device content element, the user may continue scrolling in the same direction to again display the first device content element and continue to display all following device content elements once again. In some scenarios, the scrollable field may include a very large number of device content elements. An example of such scrollable fields includes a search engine results for which the search engine continues to add relevant results to the scrollable field as the user continues scroll for as many search results the search engine has identified as relevant to the search query.

In some embodiments, the device content elements 120 may be in the form of other types of data, information, or media. For example, the device content elements 120 may be other forms of multimedia content, general search results from a search engine, restaurant listings, restaurant menus, lists of goods for sale from online vendors, social media feeds or conversations, real property for sale or rent listings, among many other things. The nature of the device content elements is intended to be non-limiting.

The user 106 may begin importing the device content elements 120 into the AR environment by providing instructions to the AR environment to begin the import process. In some embodiments, the user 106 may provide instructions by interacting with the AR environment using the AR head-mounted display 104. As an example, the instructions to the AR environment may be provided through hand gestures that are recorded by the image sensor included as part of the AR head-mounted display 104. As another example, the instructions to the AR environment may be provided via voice commands spoken by the user and received via a microphone included as part of the AR head-mounted display 104. In some embodiments, the AR head-mounted display 104 may include physical buttons, switches, touch-sensitive areas, other actuator switches, microphones, cameras, or user interface elements that may allow the user 106 to initiate the import process by interacting with the AR head-mounted display 104. In such embodiments, the user interface elements are communicably coupled to the I/O interface to thereby enable the user to provide input and/or instructions to the control circuitry and interact with the AR environment. In some embodiments, the user 106 may customize how the instructions are provided to the AR environment by, for example, selecting a particular hand gesture that will serve as the instructions, identifying a voice command that will serve as the instruction, or indicating that a specific physical interaction with an actuator or interface on the AR head-mounted display 104 will serve as the instruction.

After the user 106 has provided instructions to the AR environment to begin the import process, the AR head-mounted display 106 may begin importing the device content elements 120 displayed in the scrollable field 122 on the display screen 116 of the display device 114. To accomplish the import, the AR head-mounted display 106 captures the visible real-world scene using the associated image sensor (see the camera 322 of FIG. 3), identifies the display screen 116 of the display device 114 within the captured image, and segments the image to isolate and focus on the display screen 116. In some embodiments, the AR head-mounted display 106 may zoom in on the display screen 116 to better capture images of the display screen 116. During importation, the AR head-mounted display 106 captures content images of the display screen 116 while the user interacts with the display device 114 to scroll scrollable field 122. As the user continues to scroll the scrollable field 122, each of the device content elements 120 is displayed on the display screen 116. The XR framework analyzes each content image to segment each device content element 120 from the content image. In some embodiments, the XR framework may use semantic segmentation, to isolate and extract each device content element 120 from the content image. For example, device content elements arranged under a common top-level label may indicate that the top-level label is an attribute or key that may be used for filtering and sorting. Similarly, a common visual element, such as stars, may indicate rating. Also, bullets, asterisks, or other similar characters may separate distinct text fields. In some embodiments, the XR framework may use edge detection to find space delimiters between adjacent device content elements. For example, the system may identify horizontal and/or vertical lines that delimit individual device content elements into different spreadsheet cells. In some embodiments, the XR framework may recognize other visual cues that are inserted into lists, grids, or menus that are used to visually separate adjacent device content elements 120. In this manner, an image of one or more device content elements 120 may be obtained from each captured content image.

The captured content images may be stored in local storage associated with the AR head-mounted display 106. In some embodiments, the captured content images may be communicated to the XR framework 102 for storage. In some embodiments, the captured content images may be communicated to a cloud-based storage.

In some embodiments, the content images may be captured at a relatively low frame rate of 10 fps to 15 fps, for example. Lower or higher capture rates may be used depending upon factors such as the size of the display screen 116, the sizes of the device content elements 120 displayed on the display screen, the size of text or other fine details within the content elements, the distance of the display screen 116 from the AR head-mounted display 106, and the scrolling habits of the user, once known, among other factors. In some embodiments, the AR head-mounted display 106 may dynamically control the capture rate of content images based on the scroll rate of the user during the process of capturing content images.

The captured content images are analyzed by the XR framework 102 to identify AR content elements imaged within the captured content images. Each identified AR content element corresponds with one of the device content elements 120. Further details of the analysis process are discussed below with reference to FIG. 5. In some embodiments, the analysis may be performed by control circuitry of the AR head-mounted display 104, and the AR content elements may be stored in storage included as part of the AR head-mounted display 104. In some embodiments, the AR content elements may be communicated to the XR framework 102 for analysis. In some embodiments, the AR content elements may be communicated to a cloud-based server, other network accessible devices or servers, or combinations thereof for analysis. In some embodiments, the AR content elements may be communicated to the XR framework 102 for storage. In some embodiments, the AR content elements may be communicated to a cloud-based storage or other network accessible storage spaces for storage.

In addition to identifying individual AR content elements, the analysis of the content images may also serve to identify distinct context elements included as part of each AR content element. Each context element may be based on a common feature identified throughout the AR content elements. For example, in instances where the device content elements 120 are thumbnail images representing movies, a movie title might also be included adjacent to each thumbnail image in a common position. The analysis may therefore identify the movie titles by the presence of text in a common position adjacent to each thumbnail image. The text of each title may therefore be captured as a context element, interpreted using optical character recognition, and associated with the respective AR content element for displaying on the AR display. In addition, with the title of each movie being included as a distinct context element, the user may sort and organize the AR content elements on the AR display based on the context elements representing the title of the movie. As another example, in instances where the device content elements 120 are restaurant listings, including restaurant name, a brief description of the restaurant, a numerical rating, and a graphical star rating, the analysis may identify each of these context elements based on a common position of each and a common type of context element (e.g., text, similar graphical elements, etc.) displayed in each respective common position. The analysis may further perform OCR (optical character recognition) on text presented in each context element and interpret graphical elements as appropriate for the type of graphical element (e.g., a graphical representation of a star rating may be interpreted to approximate the rating based on the number of stars displayed for each AR content element). Each common feature may be associated with a data field, and each AR content element may be associated with a field value based on the analysis and interpretation of each respective context element. When the AR content elements are displayed on the AR display, the user may sort and/or rearrange the display of the AR content elements based on one or more of the fields associated with the AR content elements.

In some embodiments, the analysis may include retrieving additional data from public network-accessible resources relating to each AR content element. For example, if each AR content element is a thumbnail image representing a movie, short summaries of the movies and/or movie ratings from other public resources may be retrieved and associated with each AR content element.

Following importation and analysis of an AR content element, that AR content element may be displayed in real-time on the AR display. In some embodiments, display of the AR content elements may be performed after all AR content elements have been imported, as indicated by the user 106 reaching the end of the scrollable field 122 or terminating the importation by issuing a termination instruction to the AR environment using the AR head-mounted display 104. The AR content elements may be displayed in the order in which the device content elements 120 were displayed in the scrollable field, but with all the AR content elements being visible on the AR display at one time, or the user 106 may elect to arrange the AR content elements in an arrangement that best suits the user's needs (e.g., a different display layout, a different sort order, etc.). In this scenario 100, all fourteen AR content elements 124 (labeled as CE1-CE14) are displayed to the user at the same time in the AR environment. In some embodiments, when the AR content elements are displayed in an arrangement that mirrors the arrangement of the device content elements 120 on the display screen 116, the AR environment may overlay a depiction of the display device 114 onto the AR content elements to provide the user with spatial context as between the AR environment and the display device 114.

In some embodiments, the AR content elements may be rendered in the same positions they are displayed within the scrollable field on the user device, and all the AR content elements may be displayed on the AR display in the same arrangement as the corresponding device content elements are arranged within the scrollable field on the user device. The difference between the two displays is that many more (if not all) of the AR content elements may be displayed on the effectively larger AR display than the number of the corresponding device content elements are displayed on the size-limited display screen of the user device.

In some embodiments, the AR content elements may be rendered in a higher quality than the corresponding device content elements. The higher quality may include an increase in resolution, an increase in color depth, or in a larger size. The higher quality may be accomplished by the image sensor associated with the AR head-mounted display 106 having the ability to capture an image resolution and/or color depth that supports displaying the AR content elements in a higher quality. Alternatively, or in addition, the higher quality may be accomplished by the XR framework identifying the device content elements and retrieving from network-accessible resources higher quality versions of the device content elements to display as the AR content elements.

Figure 2:
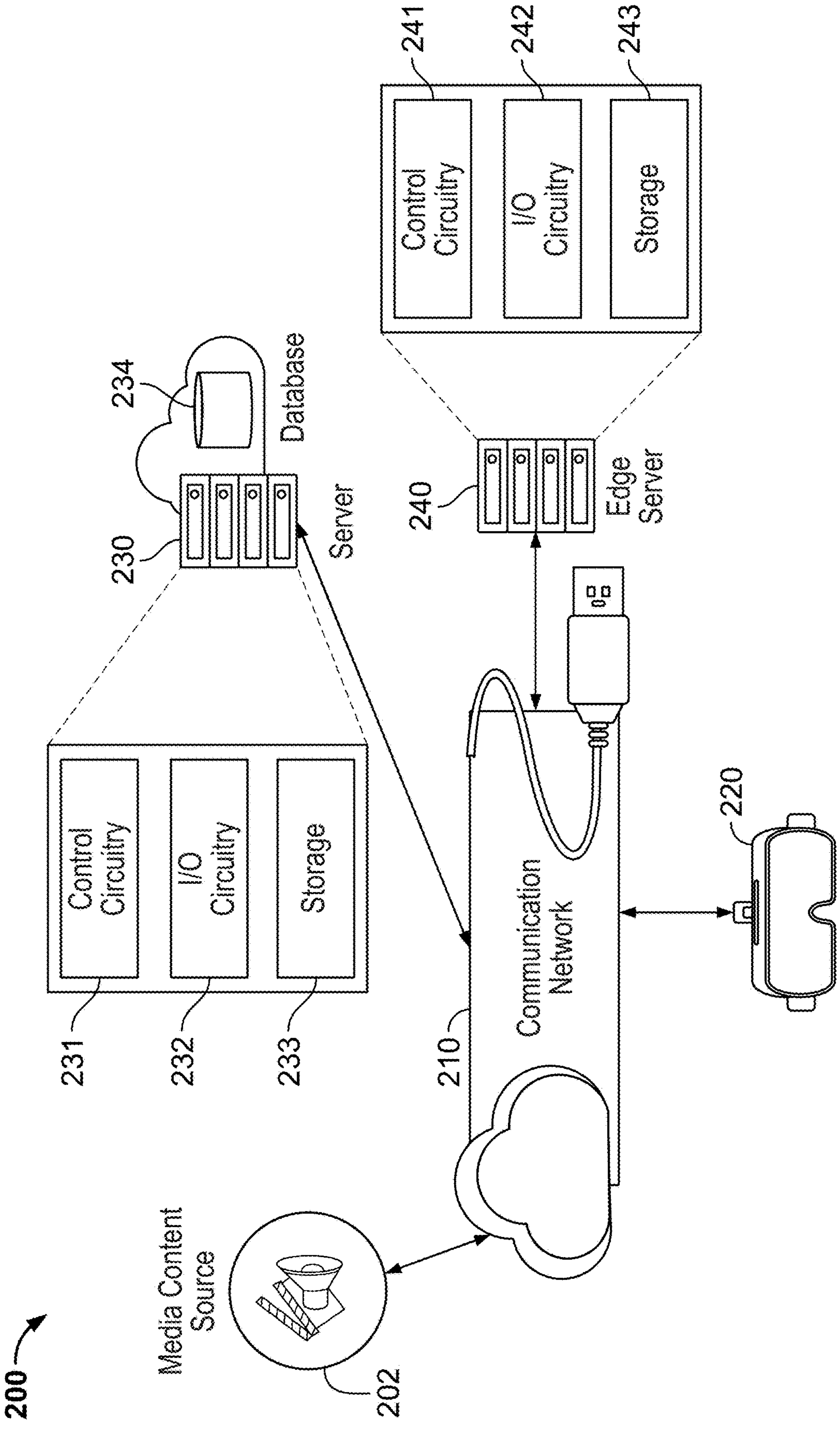
FIG. 2 shows an illustrative system for enabling importation of device content elements from a display device into an AR environment using the camera of an AR head-mounted display, in accordance with some embodiments of this disclosure.

FIG. 2 shows an illustrative system 200 for controlling content within an augmented reality (AR) environment, in accordance with some embodiments of this disclosure. The system 200 may include components for generating and providing AR content (e.g., encoder, decoder, network components, content delivery networks (CDN), etc.). The system 200 may include one or more media content source 202, one or more servers 230, and one or more edge servers 240 (e.g., included as part of an edge computing system). The system 200 also includes an AR head-mounted display 220.

The media content source 202, the server 230, or the edge server 240, or any combination thereof, may include one or more content processing devices (e.g., an encoder, graphics processing devices, etc.). The content processing devices may comprise any suitable combination of hardware and/or software configured to process data to reduce storage space required to store the data and/or bandwidth required to transmit the image data, while minimizing the impact on the quality of the content being processed. In some embodiments, the data may comprise raw, uncompressed extended reality (3D and/or 4D) media content, or extended reality (3D and/or 4D) media content in any other suitable format. In some embodiments, the AR head-mounted display 220 may receive processed data locally or over a communication network (e.g., communication network 210). In some instances, the AR head-mounted display 220 may comprise one or more converters (e.g., a decoder). Such a converter may comprise any suitable combination of hardware and/or software configured to convert received data to a form that is usable as video signals and/or audio signals or any other suitable type of data signal, or any combination thereof. The AR head-mounted display 220 may be provided with processed data and may be configured to implement one or more machine learning models to obtain an identifier of an element in a data structure and/or render a color for a particular voxel based on the identified element. In some embodiments, at least a portion of processing may be performed remote from the AR head-mounted display 220.

The AR head-mounted display 220 may access, transmit, receive, and/or retrieve content and data via corresponding I/O circuitry. Such content data may include AR content, or portions thereof, for user consumption, and the content data may also include media content that is to be incorporated as part of the AR content. As an illustrative example, a path to/from the communication network 210 may provide content (e.g., broadcast programming, on-demand programming, Internet content, content available over a local area network (LAN) or wide area network (WAN), and/or other content) and data to control circuitry and/or communication circuitry of the AR head-mounted display 220. In some embodiments, control circuitry of the AR head-mounted display 220 may be used to send and receive commands, requests, content, and other suitable data using the path to/from the communication network 210 and the communication circuitry of the AR head-mounted display 220. Such a path may communicatively couple control circuitry of the AR head-mounted display 220 to one or more other communication paths. I/O functions may be provided by one or more of these communication paths but may be shown as a single path to avoid overcomplicating the drawing. The AR head-mounted display 220 may include an optical system of one or more optical elements such as a lens in front of an eye of a user, one or more waveguides, or an electro-sensitive plane.

In some embodiments, an application of an XR framework may be executed at one or more of the control circuitry 231 of the server 230 and/or the control circuitry of the AR head-mounted display 220 and/or the control circuitry 241 of the edge servers 240. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. Any device, equipment, etc. described herein may comprise control circuitry. The server 230 may be coupled to a database 234. In some embodiments, one or more data structures discussed herein may be stored at the database 234. The data structures may be maintained at or otherwise associated with the server 230, and/or at the storage 233 and/or at storage of the AR head-mounted display 220. The communication network 210 may comprise one or more networks including the Internet, a mobile phone network, a mobile voice or data network (e.g., a 5G, 4G, or LTE network), cable network, public switched telephone network, or other types of communication network or combinations of communication networks. A communication path (e.g., depicted as an arrow connecting the AR head-mounted display 220 to the communication network 210) may separately or together include one or more distinct communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such communication paths. Communications with the AR head-mounted display 220 may be provided by one or more of these communication paths but may be shown as a single path to avoid overcomplicating the drawing. The AR head-mounted display 220 may communicate directly with other user devices via one or more communication paths as well as other short-range, point-to-point communication paths, such as USB cables, IEEE 1394 cables, wireless paths (e.g., Bluetooth, infrared, IEEE 802-11x, 5G sidelink, citizens broadband radio service (CBRS), etc.), or other short-range communication via wired or wireless paths. The AR head-mounted display 220 may also communicate other user devices directly through an indirect path the via communication network 210.

In some embodiments, an XR framework may include a client/server application where only the client application resides on the AR head-mounted display 220, and a server application resides on an external server. For example, an XR framework may be implemented partially as a client application on control circuitry of the AR head-mounted display 220 and partially on the server 230 as a server application running on control circuitry 231. The server 230 may be part of a local area network or may be part of a cloud computing environment accessed via the Internet. In a cloud computing environment, various types of computing services for performing searches on the Internet or informational databases, generating virtualized components, providing encoding/decoding capabilities, providing storage (e.g., for a database), or processing and parsing data (e.g., using machine learning algorithms described above and below) are provided by a collection of network-accessible computing and storage resources (e.g., the server 230 and/or the edge server 240), referred to as "the cloud." For example, the AR head-mounted display 220 may include a cloud client that relies on the cloud computing capabilities from the server 230 to receive and process data for AR content. When executed by control circuitry of the server 230 and/or the edge server 240, an XR framework, or parts thereof, may instruct the control circuitry 231 and/or the control circuitry 241 to perform processing tasks for the AR head-mounted display 220 and facilitate execution of the various processes.

In some embodiments, the server 230 may include control circuitry 231 and storage 233 (e.g., RAM, ROM, hard disk, removable disk, etc.). The storage 233 may store one or more databases. The server 230 may also include input/output (I/O) circuitry 232. The I/O circuitry 232 may provide protocol exchange data, device information, or other data, over a local area network (LAN) or wide area network (WAN), and/or other content and data to the control circuitry 231, which may include processing circuitry, and the storage 233. The control circuitry 231 may be used to send and receive commands, requests, and other suitable data using the I/O circuitry 232. The I/O circuitry 232 may connect the control circuitry 231 to one or more communication paths.

The edge computing server 240 may include control circuitry 241, I/O circuitry 242, and storage 243, which may be implemented in a similar manner as the control circuitry 231, the I/O circuitry 232, and the storage 233, respectively, of the server 230. The edge server 240 may be configured to be in communication with one or more of the user equipment devices 220 (e.g., devices 221-324) and/or a video server (e.g., server 230) over the communication network 210 and may be configured to perform processing tasks (e.g., encoding/decoding) in connection with ongoing processing of video data. In some embodiments, a plurality of edge servers 240 may be strategically located at various geographic locations and may be mobile edge servers configured to provide processing support for mobile devices at various geographical regions.

The control circuitry 231, 241 may be based on any suitable control circuitry. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, the control circuitry 231, 241 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 231, 241 executes instructions for an emulation system application stored in memory (e.g., the storage 233, 243). Memory may be an electronic storage device provided as the storage 233, 243 that is part of the respective control circuitry 231, 241.

Figure 3:
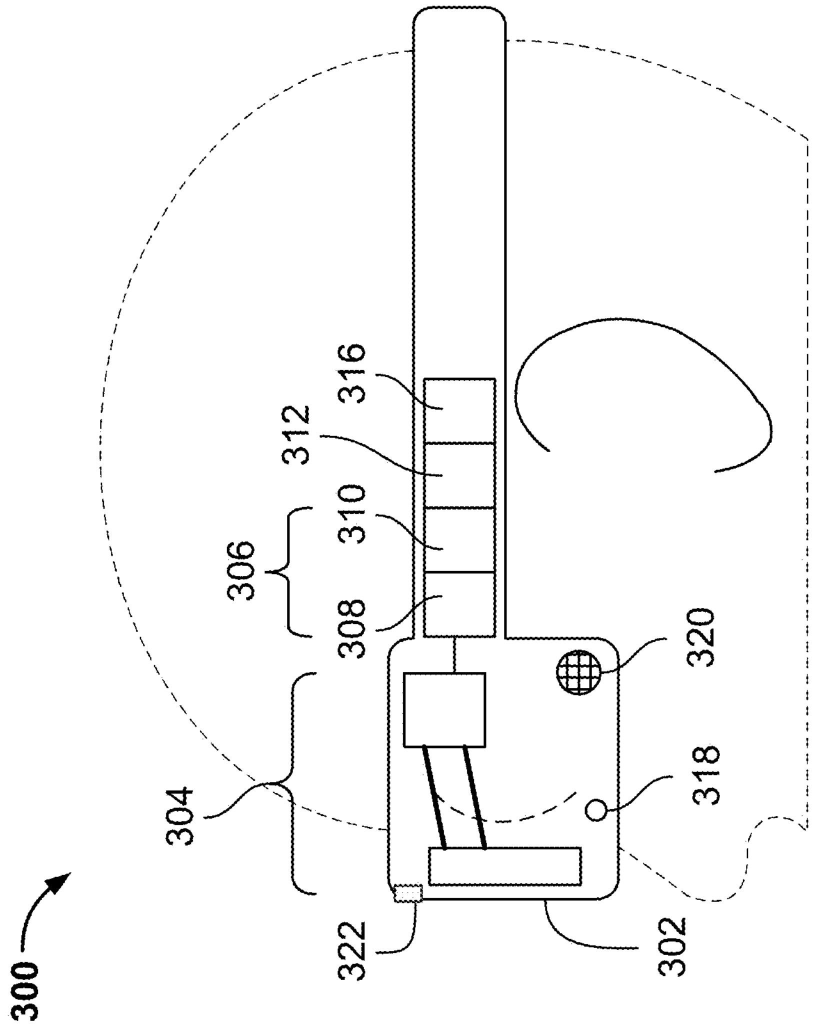
FIG. 3 shows an illustrative AR head-mounted display for enabling interaction with an AR environment, in accordance with some embodiments of this disclosure.

FIG. 3 shows an illustrative AR head-mounted display 300 for enabling a user to view and control virtual content displayed as part of an AR environment. The AR head-mounted display 300 includes components in accordance with some embodiments of this disclosure, such that the AR head-mounted display 300 shown is intended to be non-limiting. The AR head-mounted display 300 includes a display 304, control circuitry 306, storage 310, input/output (I/O) circuitry 312, a power source 316, and an image sensor in the form of a camera 322. The control circuitry 306 may include a processor 308. The AR head-mounted display 300 may also include one or more integrated components such as a microphone 318 and/or a speaker 320. The AR head-mounted display 300 may also include an input interface for communicably coupling external devices (e.g., game controllers, XR controllers, keyboards, remotes, touch-sensitive input devices, speakers, etc.) to the AR head-mounted display 300. In some embodiments, the AR head-mounted display 300 may include multiple cameras (or image sensors).

The AR head-mounted display 300 may access, transmit, receive, and/or retrieve content and data via one or more I/O paths coupled to the control circuitry 306 using the I/O circuitry 312. As an illustrative example, the I/O circuitry 312 may provide the control circuitry 306 with access to content (e.g., broadcast programming, on-demand programming, Internet content, content available over a local area network (LAN) or wide area network (WAN), and/or other content) and data. The control circuitry 306 may be used to send and receive commands, requests, and other data using the I/O circuitry 312. The I/O circuitry 312 may communicatively couple the control circuitry 306 to one or more communication paths. I/O functions may be provided by one or more of these communication paths but may be shown as a single path to avoid overcomplicating the drawing.

The display 304 is depicted as a generalized embodiment of a head-mounted display for viewing an AR environment. The display 304 may include an optical system of one or more optical elements such as a lens in front of an eye of a user, one or more waveguides, or an electro-sensitive plane. The display 304 includes an image source providing light output as an image to the optical element. The image may be modified (e.g., diffracted) using one or more elements of the optical system. For example, a 3D image may be displayed as output of the optical system in front of the eye of the user at the lens. As another example, a 3D image may be projected toward a user's eye(s) to be resolved by the retina(s). The display 304 may be a 3D display. Some non-limiting examples of a display include a tensor display, a light field display, a volumetric display, a multi-layer display, an LCD display, amorphous silicon display, low-temperature polysilicon display, electronic ink display, electrophoretic display, active matrix display, electro-wetting display, electro-fluidic display, cathode ray tube display, light-emitting diode display, organic light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying AR content.

The control circuitry 306 may be based on any suitable control circuitry. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. A processor 308 may include video processing circuitry (e.g., integrated and/or a discrete graphics processor). In some embodiments, the control circuitry 306 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 306 executes instructions for an XR framework, or parts thereof, stored in memory (e.g., the storage 310). Specifically, the control circuitry 306 may be instructed by an XR framework, or parts thereof, to perform any of the functions described herein. In some implementations, processing or actions performed by the control circuitry 306 may be based on instructions received from an XR framework or parts thereof.

The control circuitry 306 may include or be communicatively coupled to video generating circuitry and tuning circuitry, such as one or more analog tuners, one or more H.265 decoders or any other suitable digital decoding circuitry, high-definition tuners, or any other suitable tuning or video circuits or combinations of such circuits. Conversion circuitry (e.g., for converting over-the-air, analog, or digital signals to MPEG signals for storage) may also be provided. The control circuitry 306 may also include scaler circuitry for upconverting and downconverting content into a suitable output format for the AR head-mounted display 300. The control circuitry 306 may also include or be communicatively coupled to digital-to-analog converter circuitry and analog-to-digital converter circuitry for converting between digital and analog signals. The tuning and generating circuitry may be used by the AR head-mounted display 300 to receive and to display, to play, and/or to record content. The tuning and generating circuitry may also be used to receive video generating data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If the storage 310 is provided or supplemented by a separate device from the AR head-mounted display 300, the tuning and generating circuitry (including multiple tuners) may be associated with the storage 310.

The storage 310 may be any device for storing electronic data, such as random-access memory, solid state devices, quantum storage devices, hard disk drives, non-volatile memory or any other suitable fixed or removable storage devices, and/or any combination of the same. The storage 310 may be an electronic storage device that is part of the control circuitry 306. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. The storage 310 may store data defining images for display by the head-mounted display 300. The storage 310 may be used to store various types of content described herein including XR asset data. Nonvolatile memory may also be used (e.g., to launch a boot-up routine and other instructions). Cloud-based storage may be used to supplement the storage 310 or instead of the storage 310.

The control circuitry 306 may include or be coupled to the I/O circuitry 312, which is suitable for communicating with a server, edge computing systems and devices, a table or database server, or other networks or servers. The instructions for carrying out the above-mentioned functionality may be stored on a server. Such communications may involve the Internet or any other suitable communication networks or paths. In addition, the I/O circuitry 312 may include circuitry that enables peer-to-peer communication of user equipment devices, or communication of user equipment devices in locations remote from each other. In some embodiments, the I/O circuitry 312 may include circuitry that communicatively couples the AR head-mounted display 300 to one or more other devices over a network. For example, the I/O circuitry 312 may include a network adaptor and associated circuitry. The I/O circuitry 312 may include wires and/or busses for connecting to a physical network port (e.g., an ethernet port, a wireless WiFi port, cellular communication port, or any other type of suitable physical port). Although communication paths are not shown between user equipment devices, any of the described devices and equipment may communicate directly or indirectly with each other via one or more communication paths and/or communication networks including short-range, point-to-point communication paths, such as USB cables, IEEE 1394 cables, wireless paths (e.g., Bluetooth, infrared, IEEE 802-11x, etc.), or other short-range communication via wired or wireless paths. For example, the I/O circuitry 312 may include a Bluetooth network adaptor.

The power source 316 may include a source of power or an interface for coupling to an external power source. The power source 316 may be coupled to other components of the AR head-mounted display 300. Some non-limiting examples of a power source 316 include a battery, solar generator, and/or a wired power source.

The microphone 318 and the speaker 320 may be included as integrated equipment with other elements of the AR head-mounted display 300. In some embodiments, the microphone 318 and the speaker 320 may be external to the AR head-mounted display 300 as stand-alone units. An audio component of videos and other content may be played through the speaker 320 (or external headphones or other external audio device). In some embodiments, the control circuitry 306 may be configured to provide audio cues, feedback, or instructions to the user through the speaker 320. The microphone 318 may receive audio input such as voice commands or speech. For example, a user may speak letters or words that are received by the microphone 318 and converted to text by control circuitry 306. As another example, a user may speak voice commands that are received by the microphone 318 and recognized by control circuitry 306.

The image sensor (shown in the form of the camera 322) may be any suitable type of image sensor, camera, or other form of optical sensor operating in the visual spectrum that is configured to capture successive images as a video. In some embodiments, the image sensor is integrated with the AR head-mounted display 300. In some embodiments, the image sensor may be external and communicably connected to the AR head-mounted display. In some embodiments, the image sensor may be a digital camera that includes a charge-coupled device (CCD) and/or a complementary metal-oxide semiconductor (CMOS) image sensor. In some embodiments, the image sensor may be an analog camera that converts still analogue images to digital images via the control circuitry 306 or via a video card.

In some embodiments, the AR head-mounted display 300 may be communicatively coupled to one or more user input interfaces or devices. Some examples of input devices include a remote control, a secondary user device, a touch-sensitive display, a smartphone device, a tablet, a remote control, mouse, trackball, keypad, keyboard, touchscreen, touchpad, stylus input, joystick, voice recognition interface, and/or other user input interfaces. In some embodiments, the AR head-mounted display 300 may include an integrated user input interface capable of tracking a user's eyes and/or detecting visual and/or audio cues. In some embodiments, the AR head-mounted display 300 may include one or more user interfaces (e.g., buttons, touch-sensitive bars, etc.) for a user to manually provide input to the AR head-mounted display 300.

As indicated above, an XR framework, or parts thereof, may be implemented using any suitable architecture. By way of example, an XR framework may be configured as a stand-alone application that may be wholly implemented on the AR head-mounted display 300. Instructions of the application may be stored locally (e.g., in the storage 310), and data for use by the application may be downloaded on a periodic basis (e.g., from an out-of-band feed, from an Internet resource, or using another suitable approach). The control circuitry 306 may retrieve instructions of the application from the storage 310 and process the instructions to provide networking functionality and perform any of the actions described herein.

In some embodiments, an XR framework, or parts thereof, may include a client/server-based application. In client/server-based embodiments, the control circuitry 306 may include or be coupled to the I/O circuitry 312 for communicating with a server or other networks or servers. An XR framework, or parts thereof, may be a stand-alone application implemented on a device or a server. An XR framework, or parts thereof, may be implemented as software or a set of executable instructions. An application and/or any instructions for performing any of the embodiments discussed herein may be encoded on computer-readable media. The computer-readable media may be non-transitory, including, but not limited to, volatile and non-volatile computer memory or storage devices such as a hard disk, floppy disk, USB drive, DVD, CD, media card, register memory, processor cache, random access memory (RAM), a hard drive, random-access memory on a DRAM integrated circuit, read-only memory on a BLU-RAY disk, etc. For example, in FIG. 3, the instructions may be stored in the storage 310, and executed by the control circuitry 306 of the AR head-mounted display 300.

Data for use by a thick or thin client implemented on the AR head-mounted display 300 may be retrieved on demand by issuing requests to a server remote to the AR head-mounted display 300. For example, the remote server may store the instructions for the application in a storage device. The remote server may process the stored instructions using circuitry (e.g., the control circuitry 306) and generate the renderings discussed above and below. The client device may receive the displays generated by the remote server and may display the content of the displays locally on the AR head-mounted display 300. This way, the processing of the instructions is performed remotely by the server while the resulting displays (e.g., which may include text, a keyboard, or other visuals) are provided locally on the AR head-mounted display 300.

In some embodiments, an XR framework, or parts thereof, may be downloaded and interpreted or otherwise run by an interpreter or virtual machine (run by control circuitry 306). In some embodiments, an XR framework, or parts thereof, may be encoded in the ETV Binary Interchange Format (EBIF), received by control circuitry 306 as part of a suitable feed, and interpreted by a user agent running on control circuitry 306. For example, an XR framework, or parts thereof, may include an EBIF application. In some embodiments, an XR framework, or parts thereof, may be defined by a series of JAVA-based files that are received and run by a local virtual machine or other suitable middleware executed by control circuitry 306. In some of such embodiments (e.g., those employing MPEG-2 or other digital media processing schemes), an XR framework, or parts thereof, may be, for example, encoded and transmitted in an MPEG-2 object carousel with the MPEG audio and video packets of a program.

Figure 4:
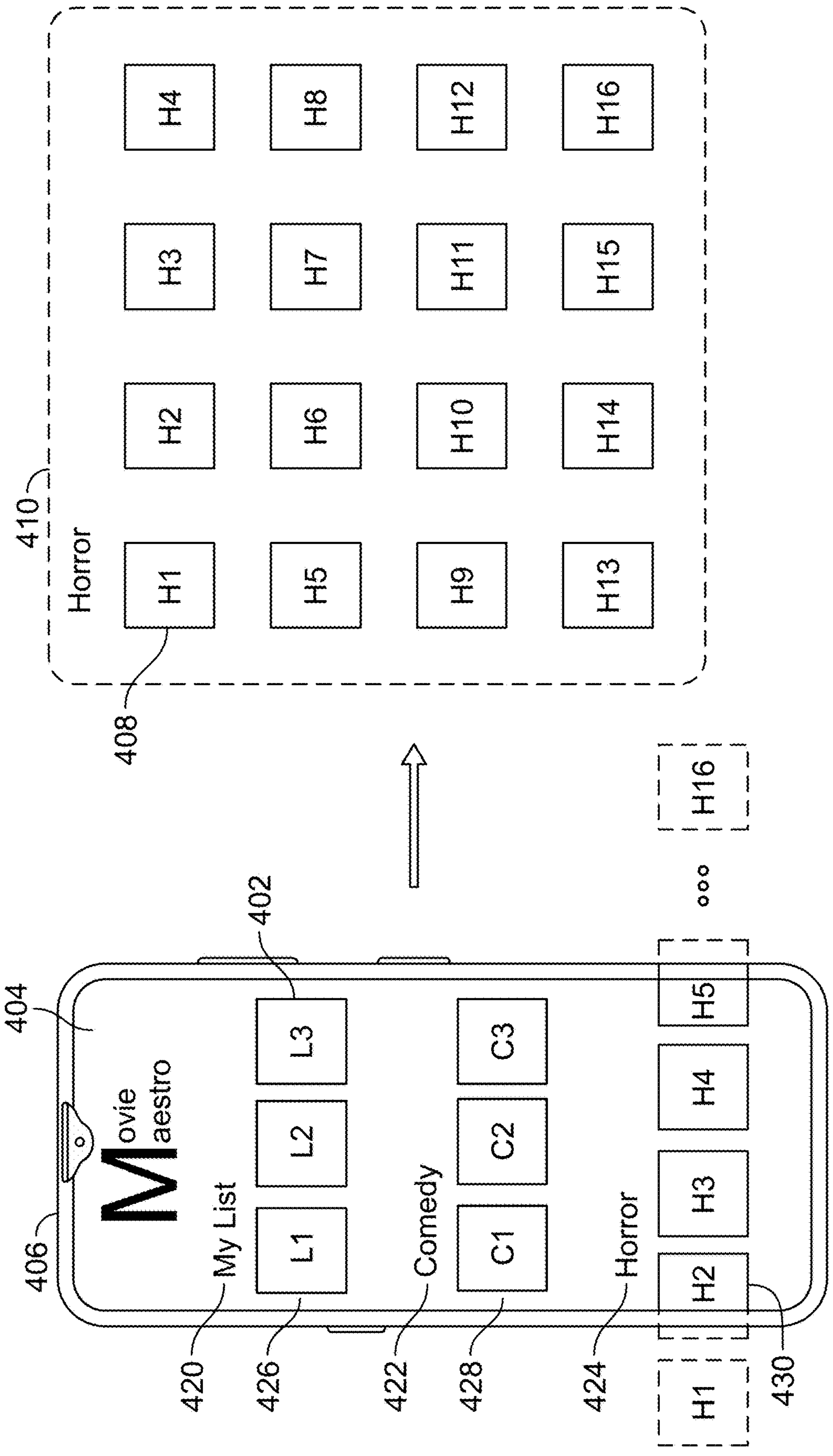
FIG. 4 shows an illustrative display device displaying device content elements in a scrollable field and corresponding AR content elements displayed on an AR display.

FIG. 4 illustrates the importation of device content elements 402 displayed on the display screen 404 of a user device 406, shown here as a smartphone, and the transformation of the arrangement of the corresponding AR content elements 408 displayed on an AR display 410. Although the display screen 404 and the AR display 410 are shown in the figure having similar overall dimensions, in practice the AR display 410 may have, perceptually to the user, substantially larger dimensions as compared to the physical dimensions of the display screen 404. The user device 406 is displaying device content elements 402 on the display screen 404, and the device content elements 402 are shown as a plurality of thumbnail images representing movies in three different category fields 420-424, each category field 420-424 being in a scrollable field 426-430. The first category field 420 is labeled as "My list" and has three thumbnail images L1-L3 visible in the first scrollable field 426. The total number of thumbnail images in the first category field 420 may be more than the three thumbnail images L1-L3 shown. The second category field 422 is labeled as "Comedy" and has three thumbnail images C1-C3 visible in the second scrollable field 428. The total number of thumbnail images in the second category field 422 may be more than the three thumbnail images C1-C3 shown. The third category field 424 is labeled as "Horror" and has two full thumbnail images H3, H4 and two partial thumbnail images H2, H5 visible in the third scrollable field 430. 404. The third category field 424 includes a total of 16 thumbnail images H1-H16. In this example, the user is interested in selecting a horror movie to watch.

Using the AR head-mounted display, the user may initiate scroll mode to import the thumbnail images H1-H16 of horror movies, the device content elements in this example, from the display screen 404 into the AR environment to be displayed as AR content elements on the AR display 410. In this example, only the thumbnail images H1-H16 of horror movies are imported, and the displayed thumbnail images L1-L3 in the My List field and the thumbnail images C1-C3 displayed in the comedy field are not imported. Since the scrollable field 430 for horror movies is the only location on the display screen 404 that shows scrolling movement, in this example only the device content elements in the scrollable field 430 are imported. In some embodiments, all content elements displayed on the display screen 404 may be imported, whether or not the content elements are subject to movement within a scrollable field. Upon finishing importation, the user may view all the thumbnail images H1-H16, as AR content elements, at the same time on the AR display 410. By being able to view all the thumbnail images H1-H16 at the same time on the AR display 410, the user may have a significantly easier time determining which horror movie to watch. The user may select a thumbnail image (i.e., the AR content element) representing a desired horror movie for watching, and as disclosed below, the AR environment may guide the user to select the corresponding horror movie on the display screen 404 of the user device 406.

Figure 5:
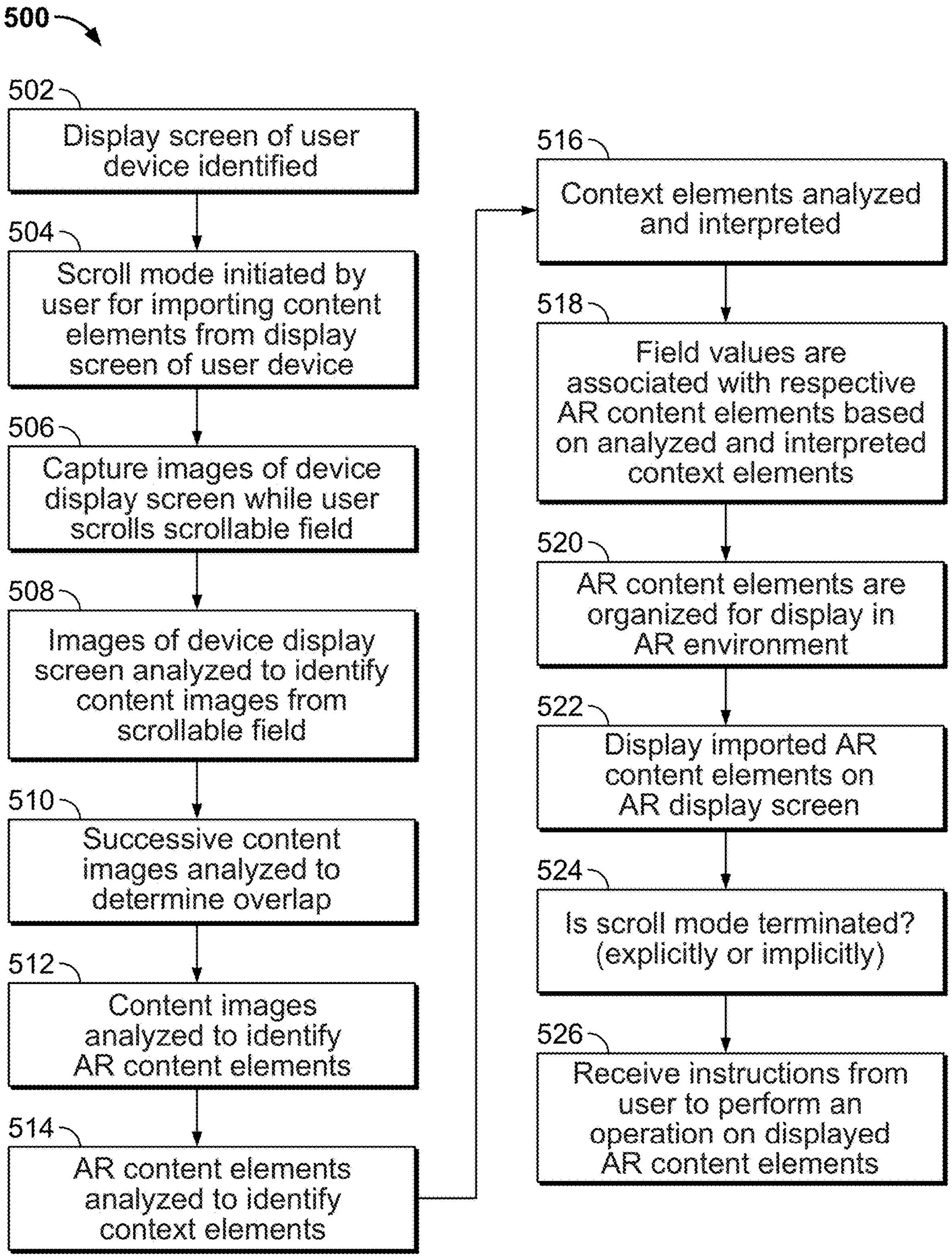
FIG. 5 shows a flowchart of illustrative steps involved in importing device content elements into an AR environment.

FIG. 5 shows a flowchart illustrating the steps of a process 500 for importing content into an AR environment from a user device without direct communication between the AR environment and the user device. The process 500 may be implemented on the XR framework discussed herein and similar systems for generating, controlling, and displaying an AR environment, including an AR head-mounted display. One or more actions of the process may be incorporated into or combined with one or more actions of any other process or embodiments described herein. At step 502, the display screen of the user device is identified by the AR head-mounted display, using the associated camera, as being within the visual field of the user wearing the AR head-mounted display. At step 504, scroll mode for the AR environment is activated following input from the user to activate scroll mode. As described herein, scroll mode is used for importing content elements from the display screen of the user device into the AR environment.

In some embodiments, the AR head-mounted display, using the associated camera, may continuously monitor a user device that comes within the field of view of the camera to determine when to automatically initiate importation of device content elements. For example, the XR framework may, through imaging of the display screen, identify a structured grouping of device content elements and automatically initiate importation of the device content elements when movement of those device content elements is detected on the display screen. Through such continuous monitoring, the XR framework may obtain initial content images prior to the user scrolling, and those initial content images may be included in the subsequent analysis for identifying content elements.

At step 506, images of the display screen are captured, using the camera of the AR head-mounted display, while the user scrolls a scrollable field on the display screen of the user device. At step 508, images of the display screen are analyzed to identify content images. In some embodiments, identified content images may be limited to the portion of the display screen of the user device that includes the scrollable field, with the boundaries of the scrollable field being determined based on movement of objects on the display screen within the scrollable field. In some embodiments, the content images may be identified as including the entire display screen, including those portions of the display screen within the scrollable field being scrolled by the user and those that are not within the scrollable field. At step 510, successive content images are analyzed to determine any overlap between the successive images, which may be detected by comparing pixel arrays between the successive images. In some embodiments, the AR environment may crop a content image to eliminate the overlapping portion from one of the successive content images to facilitate further analysis without the overlapping portions. In some embodiments, the overlapping portion from one of the successive content images may be marked to signify that the overlapping portion should be ignored during further processing.

After content images have been captured and analyzed, at step 512 each content image is analyzed to identify, using segmentation as described herein, AR content elements within the content image. At step 514, each AR content element is analyzed to identify context elements that may be included as part of the AR content element. At step 516, identified context elements are analyzed and interpreted. As part of this analysis, OCR may be performed on a context element when that context element is determined to include text. Also, as part of this analysis, graphical elements may be interpreted as appropriate based on the type and nature of the graphical element (e.g., a graphical representation of a star rating may be interpreted to approximate the rating based on the number of stars displayed with each AR content element). At step 518, field values are associated with respective AR content elements, each field value having an assigned value based on one of the analyzed and interpreted context elements. At step 520, the AR content elements, including associated field values, are organized for display in the AR environment. In step 522, the imported AR content elements are displayed on the AR display. In some embodiments, steps 508-522 may be performed while the AR head-mounted display continues to capture images of the display screen in step 506. In such embodiments, an AR content element may be displayed on the AR display immediately following completion of analyses in steps 512-520.

At step 524, the XR framework checks to determine if the scroll mode has been terminated. In some embodiments, scroll mode may be implicitly terminated once scrolling has stopped because the user has reached an end of the scrollable field. In some embodiments, particularly those where wrap around scrolling is implemented, scroll mode may be implicitly terminated if the XR framework determines that multiple duplicate AR content elements are being imported (such as when the scrollable field has scrolled back to the beginning of the group of device content elements). In some embodiments, scroll mode may be explicitly terminated by a voice command spoken by the user. In some embodiments, scroll mode may be explicitly terminated by a hand gesture made by the user. In some embodiments, scroll mode may be explicitly terminated by the user interacting with physical buttons, switches, touch-sensitive areas, or other actuator switches or interfaces included as part of the AR head-mounted display and configured to cause scroll mode to terminate. In some embodiments, scroll mode may not be terminated at the end of the scrollable field if the end of the scrollable field includes an indicator that more results may be displayed if the user follows a hyperlink (e.g., a hyperlink labeled as "Next"). In such embodiments, scroll mode may continue if the user follows the hyperlink, and scroll mode may be terminated explicitly or implicitly by means other than the user reaching the end of the scrollable field.

At step 526, the XR framework may receive instructions from the user to perform an operation on the AR content elements displayed on the AR display. The instructions from the user may direct the XR framework to perform such actions as rearranging the layout of the AR content elements, sorting the AR content elements, displaying a subset of the AR content elements, retrieving additional information from a network-accessible resource concerning one or more of the AR content elements, among other actions. The scope of the actions that the user may perform on the AR content elements are intended to be non-limiting.

FIG. 6 shows a flowchart illustrating the steps of a process 600 for dynamically adjusting the image capture rate for importing content from a display screen. The process 600 may be implemented on the XR framework discussed herein and similar systems for generating, controlling, and displaying an AR environment, including an AR head-mounted display. One or more actions of the process may be incorporated into or combined with one or more actions of any other process or embodiments described herein. At step 602, the AR head-mounted display captures a first image of the display screen using the camera included as part of the AR head-mounted display. At step 604, the AR head-mounted display captures a subsequent image of the display screen. At step 606, the XR framework determines whether there is overlap between two successively captured images, and if overlap between successive captured images is determined to exist, at step 608 the overlap is used to calculate an overlap metric. In some embodiments, the overlap metric is a measure of the similarities between successive captured images based on the image objects included in the captured images (ignoring black and/or background space). If successive images of the display screen contain substantial similarities, the overlap metric returns a larger value to reflect the substantial similarities. On the other hand, if successive images of the display screen contain few similarities, the overlap metric returns a smaller value to reflect that similarities exist, but there are fewer of them. If the overlap metric returns a zero (for example), there are no similarities between the successive images. At step 610, the overlap metric is compared to an upper threshold value, and if the overlap metric is greater than the upper threshold value, at step 612 the image capture rate is decreased to generate less overlap between successive images. The process 600 then continues to capture additional images at step 604. At step 614, the overlap metric is compared to a lower threshold value, and if the overlap metric is greater than the lower threshold value, the process 600 continues to capture additional images at step 604. However, if the overlap metric is less than the lower threshold value, then at step 616 the overlap metric checked to determine if it is equal to zero. If the overlap metric is not zero, at step 618 the image capture rate is increased to generate more overlap between successive images. The process 600 then continues to capture additional images at step 604. However, if the overlap metric is zero, at step 620 the XR framework terminates scroll mode, presents an error message to the user within the AR environment, and instructs the user to restart scroll mode.

Figure 7:
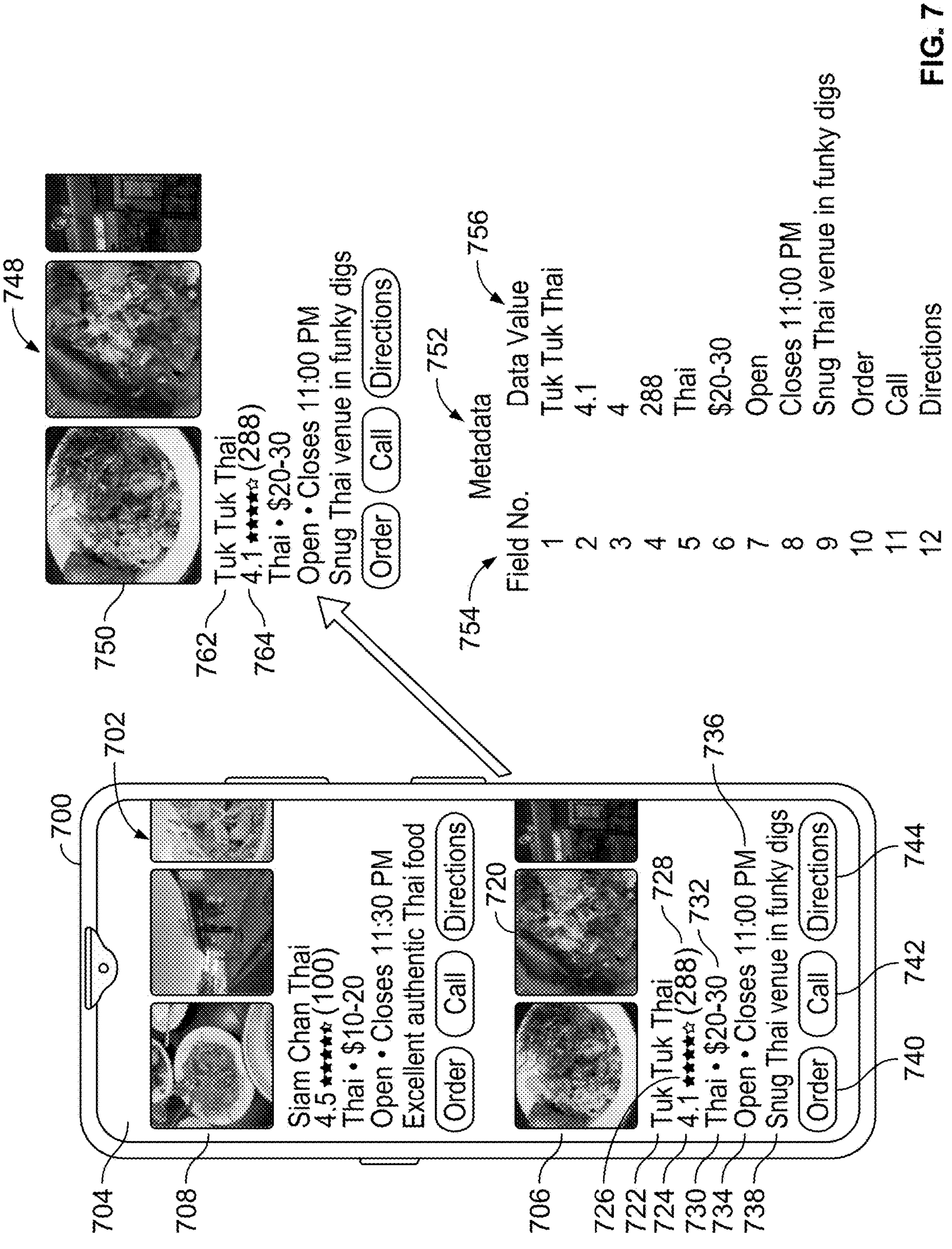
FIG. 7 graphically illustrates the AR environment importing and analyzing device content elements that include context elements, and associated fields, based on the context elements, with the corresponding AR content elements.
Figure 8:
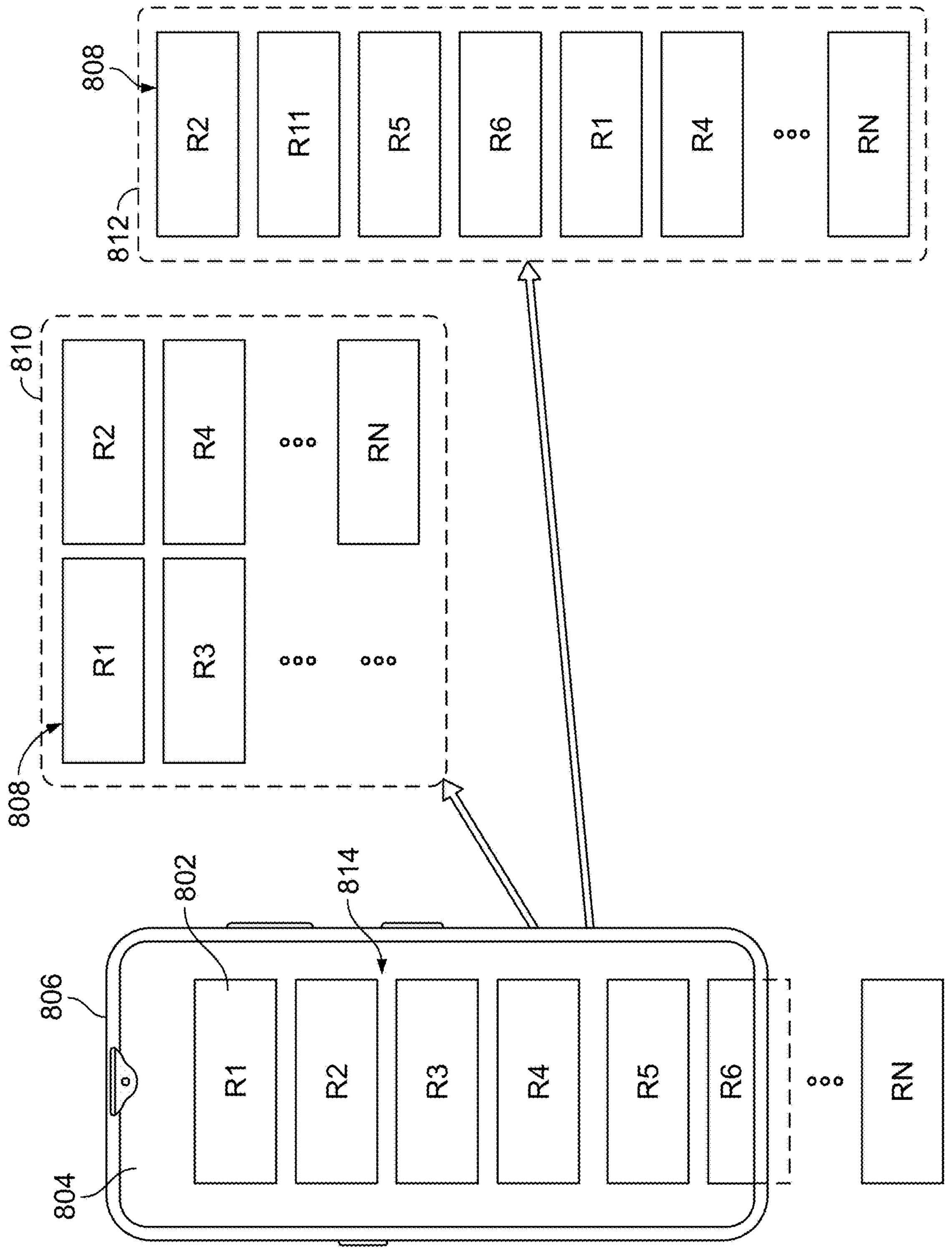
FIG. 8 graphically illustrates the AR environment presenting the AR content elements in different arrangements on the AR display as compared to the device content elements on the display screen.

FIG. 7 shows a user device 700 displaying device content elements 702 on the display screen 704 and graphically illustrates, through an example, one way in which the XR framework may analyze the device content elements 702 that include context elements during the importation process. For simplification, the user device 700 shows two complete device content elements 706, 708 from search results for a restaurant, and does not show the additional device content elements that may also be present as part of search results. For purposes of clarity, this example is based on the analysis performed by the XR framework on the complete device content element 706, with recognition that the XR framework would process other device content elements from the same import in the same manner. Moreover, the XR framework may apply this same type of analysis on any group of device content elements. As an initial part of the import process, the XR framework compares two device content elements 706, 708 to identify whether common features are present as between the two device content elements 706, 708. In instances where common features are identified, the following analysis proceeds for each subsequent device content element that shares the common features.

In this example, the XR framework would identify several common elements 720-744, which will be described in connection with the device content element 706. The common features may be separately identified by being on separate lines in the device content element 706, and/or by being separated by a demarcation character, and/or by other distinguishing characteristics. One common feature 720 includes images relating to the restaurant. Since the images include no text or other common graphical features, the XR framework may not do any further processing on this common feature 720 as there is no further information to be extracted from these images. Therefore, while the AR content element 748 includes the restaurant images 750, the XR framework may not associate any metadata with the restaurant images 750.

Another common feature 722 includes text which the user may recognize as the name of the restaurant (the XR framework may not recognize the nature of text included as part of a common feature unless the XR framework is trained to recognize such information). The XR framework may perform OCR on the text in the common feature 722 and store the extracted data as metadata associated with the AR content element 748. As shown, the extracted text is stored in a metadata table 752 associated with the AR content element 748. In this example, the metadata table 752 includes two columns, a first column for a field number 754 and a second column for the data value 756. The XR framework associates the field number 754 with the corresponding common feature in the AR content element 748, and the data value 756 stores the metadata extracted from the corresponding common feature. Thus, in the case of the common feature 762, the XR framework may assign the field number ‘1’ to this common feature 762 and insert the text ‘Tuk Tuk Thai’ as metadata into the data value field associated with the field number ‘1’. In some embodiments, where the nature of the context data is understood by the XR framework, a data type identifier may be assigned in lieu of a field number. The XR framework may also denote the common feature 762 in the AR content element 748 with a marking to indicate to the user that the common feature 762 is associated with metadata. In some embodiments, the marking may be underline, highlight, bold text, etc., to indicate that the common feature 762 may be searchable, sortable, or be used to locate further information relating to the AR content element 748. In some embodiments, the metadata associated with the common features of content elements may be stored in other formats, such as in an html format, a markdown format, and/or any other desired format without limitation.

Other common features include text field 724 (the ‘4.1’) and a stars graphic 726 (the four full stars plus the one outline of a fifth star). In some embodiments, the text field 724 may be identified as a separate common feature from the stars graphic 726. In instances where the common feature of the text field 724 is determined to include both the text and the stars, the XR framework may perform OCR on the text and ignore the stars as a graphic. The XR framework may then insert the extracted text into the metadata table 752. In instances where the graphic is identified as a separate common feature from the text, the XR framework may use the stars graphic 726 to estimate how many full and partial stars are present in the stars graphic 726. Each of the other text-based common features 726-744 may be similarly analyzed by the XR framework and have the associated metadata inserted into the metadata table 752. The completed metadata table 752 shown in FIG. 7 may be the end result of the analysis of importation of the device content element 706 into the AR environment as the AR content element 748. The XR framework may store the metadata table 752 with the associated AR content element 748 to facilitate reference and retrieval.

In some embodiments, the XR framework may be able to determine the search terms and the search engine from imported search results. For some imported content, this information may be readily available on the device display, thus making it detectable by the XR framework when importing the content into the XR framework. In some embodiments, the search terms and the search engine may be saved as metadata along with the imported content. By saving the search terms and search engine as metadata, the user may recall the search, update the search results, and/or enhance the search at a later time.

In some embodiments, the XR framework may employ a trained machine learning model to recognize, parse, and categorize content data imported from the display screen. Through such analyses by a machine learning model, the XR framework may generate the metadata associated with each AR content element. The metadata, in such an embodiment, may be in a format that is different from the metadata table 752 shown. For example, data extracted from each common feature may be associated with a sorting type instead of a field number, among other potential differences. Also, in such embodiments, the machine learning model may further analyze and interpret the context data extracted from each common feature so that additional information, obtained from other servers and/or devices connected to the network, may be obtained and displayed to the user.

AR 8 illustrates the importation of device content elements 802 displayed on the display screen 804 of a user device 806, shown here as a smartphone, and the ability of the AR environment to present the corresponding AR content elements 808 in a first arrangement 810 (a two-column arrangement) and/or in a second arrangement 812 having a different sort order on an AR display. In this example, the user device 806 is displaying device content elements 802 on the display screen 804, and the device content elements 802 are shown schematically in a scrollable field 814. The device content elements 802 are labeled R1-RN and are arranged in a single column in order of R1-RN within the scrollable field 814 on the display screen 804. Using the AR head-mounted display, the user may initiate scroll mode to import the device content elements 802 from the display screen 804 into the AR environment to be displayed as the AR content elements 808 on the AR display. Once the device content elements 802 are fully imported into the XR environment and displayed on the AR display as the AR content elements 808, the user may have several options for displaying the AR content elements 808. One option is the two-column arrangement 810, in which the AR content elements 808 are arranged in order of R1-RN in a row-by-row arrangement. Another option is the single column arrangement 812, in which the AR content elements 808 are arranged and displayed in a different sort order on the AR display than they are on the display screen 804. Other display arrangements may also be available to display the AR content elements on the AR display. The XR framework allows the user to choose the arrangement and order of the AR content elements 808 on the AR display. The XR framework may also allow the user to switch between arrangements 810, 812 by instructing the AR environment to display a different arrangement. The XR framework may also allow the user to sort the AR content elements 808 in a desired sort order based on metadata that becomes associated with the AR content elements 808 at the time of importation.

FIG. 9 illustrates the importation of device content elements 902 displayed on the display screen 904 of a user device 906, shown here as a desktop computer screen, and the subsequent display of the corresponding AR content elements 908 on an AR display. In this example, the user device 906 is displaying the device content elements 902 on the display screen 904, and the device content elements 902 are included as part of a spreadsheet 910, which forms the scrollable field in this example. Each device content element 902 is one of the cells in the spreadsheet 910. Importation of the device content elements 902 into the AR environment occurs in the same manner as disclosed herein for other examples, with the exception that the XR framework may be configured to recognize that the device content elements are arranged into a spreadsheet 910. During importation, the XR framework analyzes and interprets each device content element 902 (each cell) and then may begin displaying the spreadsheet 910 in the AR environment in real-time while the import process is in scroll mode. The user is therefore able to view the AR spreadsheet 912 as the cells are populated and displayed on the AR display. In some embodiments, if the AR spreadsheet 912 becomes larger than the field of view available with the AR display (some spreadsheets can be extremely large), the AR spreadsheet 912 may be displayed with a smaller font and/or shrink the image of the AR spreadsheet 912. In some embodiments, when the AR spreadsheet 912 becomes larger than the available field of view, the AR spreadsheet may be extended to show in multiple side-by-side columns. In some embodiments, the XR framework may recognize one row of the device spreadsheet 910 to include column labels that may be used as sorting keys for the AR spreadsheet 912. In some embodiments, once the importation process is complete, the user may be able to edit the AR spreadsheet 912 to add column labels for sorting or to perform other types of editing on the imported AR spreadsheet 912. Some advantages to being able to import an entire spreadsheet into the AR environment using the process disclosed herein include enabling the user to re-sort the AR spreadsheet 912 to perform further analyses, to save the AR spreadsheet 912 as a file within (or even outside of) the AR environment for further editing, and/or to import the AR spreadsheet 912 into the user's preferred spreadsheet software. The user's further manipulation of the AR spreadsheet following importation is intended to be non-limiting.

Figure 10:
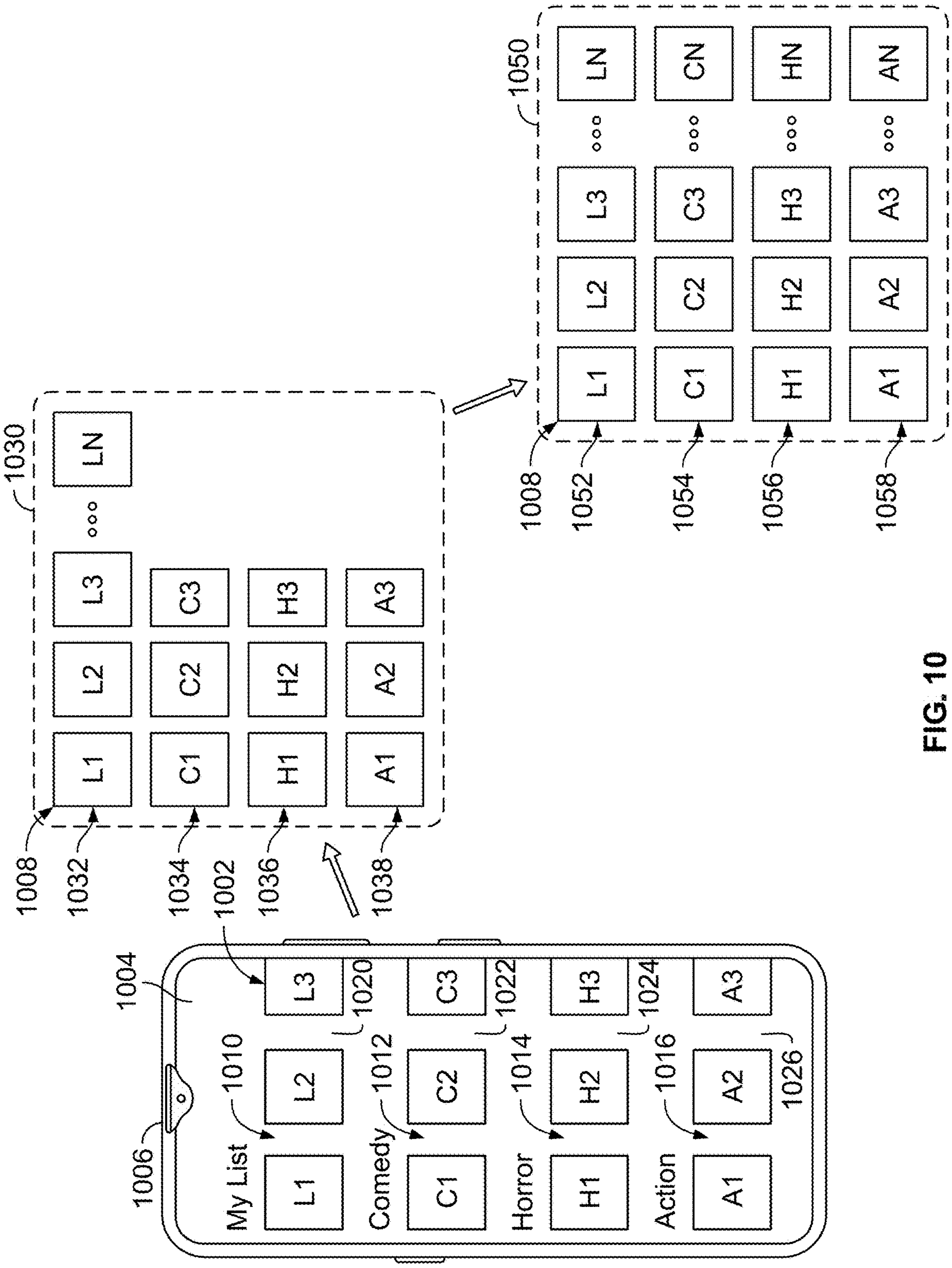
FIG. 10 graphically illustrates the AR environment importing content elements from multiple scrollable fields.

FIG. 10 illustrates the importation of device content elements 1002 displayed on the display screen 1004 of a user device 1006, shown here as a smartphone, and the subsequent display of the corresponding AR content elements 1008 on an AR display screen during and at the conclusion of the importation process. The AR display may effectively have substantially larger dimensions as compared to the physical dimensions of the display screen 1004. The user device 1006 displays the device content elements 1002 on the display screen 1004, and the device content elements 1002 are shown schematically as a plurality of thumbnail images representing movies in four different category fields 1010-1016, each category field 1010-1016 being in a scrollable field 1020-1026. The first category field 1010 is labeled as "My List" and has three thumbnail images L1-L3 wholly or partially visible in the first scrollable field 1020. The total number of thumbnail images in the first scrollable field 1020 is L1-LN, although for purposes of clarity all are not shown. The second category field 1012 is labeled as "Comedy" and has three thumbnail images C1-C3 wholly or partially visible in the second scrollable field 1022. The total number of thumbnail images in the second scrollable field 1022 is C1-CN, although for purposes of clarity all are not shown. The third category field 1014 is labeled as "Horror" and has three thumbnail images H1-H3 wholly or partially visible in the third scrollable field 1024. The total number of thumbnail images in the third scrollable field 1024 is H1-HN, although for purposes of clarity all are not shown. The fourth category field 1016 is labeled as "Action" and has three thumbnail images A1-A3 wholly or partially visible in the fourth scrollable field 1026. The total number of thumbnail images in the fourth scrollable field 1026 is A1-AN, although for purposes of clarity all are not shown. In this example, the user is interested in viewing all the movies listed in each of the categories and selecting one movie to watch.

Using the AR head-mounted display, the user may initiate scroll mode to import the thumbnail images L1-LN, C1-CN, H1-HN, and A1-AN (the device content elements in this example) from all scrollable fields 1020-1026 from the display screen 1004 into the AR environment to be displayed as AR content elements on the AR display. After all the thumbnail images L1-LN from the My List category are imported into the AR environment, the AR display may display a partially imported view 1030 of the AR content elements 1008, which includes all the thumbnail images L1-LN, and wholly or partially three thumbnail images C1-C3, H1-H3, and A1-A3 in each of the Comedy, Horror, and Action categories. This partially imported view 1030 of the AR content elements 1008 is an intermediate stage of the importation process. While the user may stop the import process at this stage, in this example the user imports all thumbnail images from all four categories 1010-1016. Once all four categories 1010-1016 of the thumbnail images L1-LN, C1-CN, H1-HN, and A1-AN have been imported, the AR display may display a first view 1050 of the AR content elements 1008. With a full view of the AR content elements in all four categories 1052-1058, the user may peruse all the thumbnail images L1-LN, C1-CN, H1-HN, and A1-AN on the AR display and select a movie to watch on the display screen 1004 using processes described herein.

As disclosed herein, once the user has made a selection within the AR environment, the AR environment may then guide the user to select the corresponding movie on the display screen 1004 so that the user may watch the selected movie on the display screen 1004.

Figure 11:
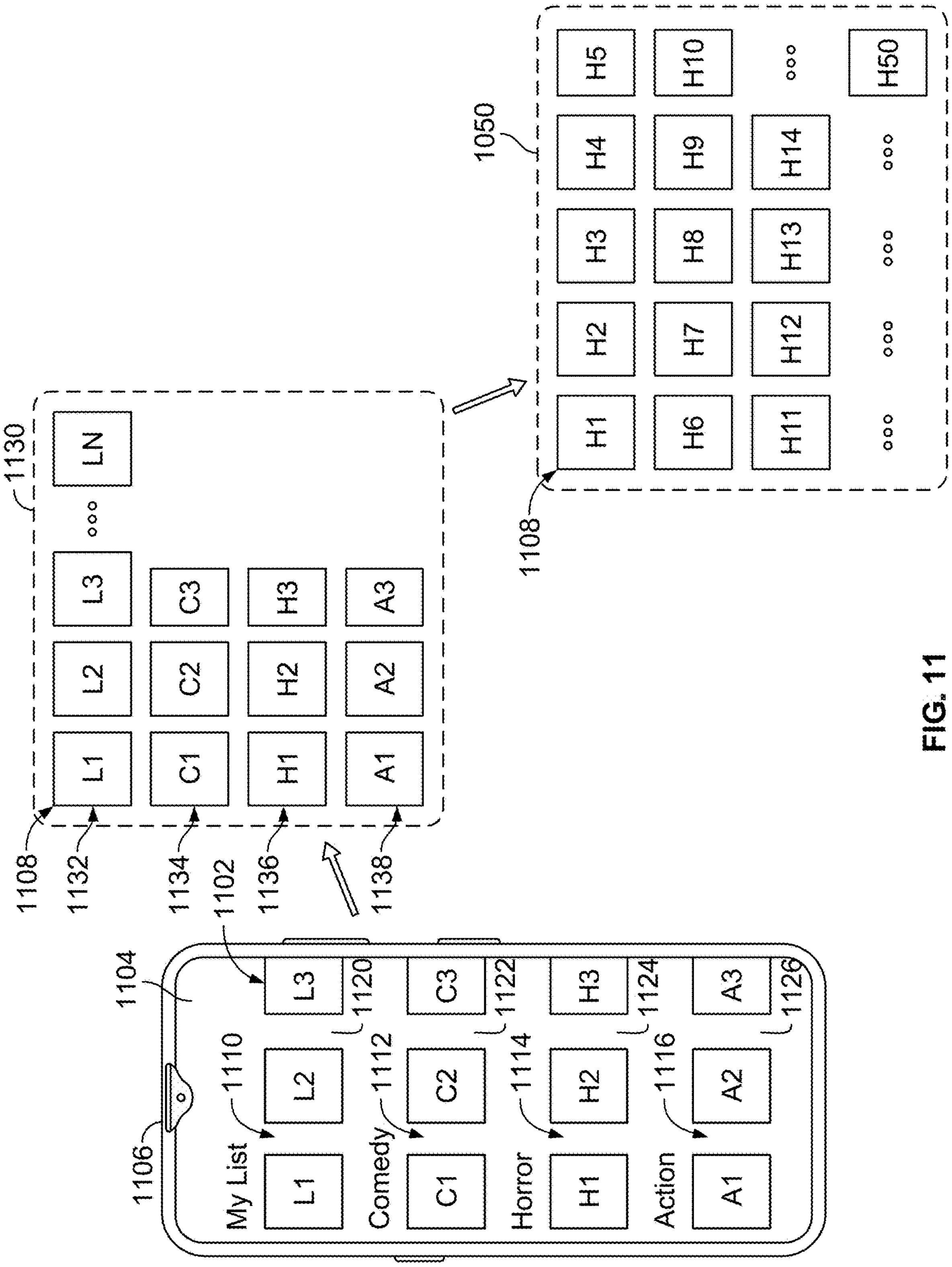
FIG. 11 graphically illustrates the AR environment displaying content elements from a user-selected scrollable field following import of multiple scrollable fields from a display device.

FIG. 11 illustrates the importation of device content elements 1102 displayed on the display screen 1104 of a user device 1106, shown here as a smartphone, and the subsequent display of the corresponding AR content elements 1108 on an AR display during and at the conclusion of the importation process. The AR display may effectively have substantially larger dimensions as compared to the physical dimensions of the display screen 1104. The user device 1106 displays the device content elements 1102 on the display screen 1104, and the device content elements 1102 are shown schematically as a plurality of thumbnail images representing movies in four different category fields 1110-1116, each category field 1110-1116 being in a scrollable field 1120-1126. The first category field 1110 is labeled as "My List" and has three thumbnail images L1-L3 wholly or partially visible in the first scrollable field 1120. The total number of thumbnail images in the first scrollable field 1120 is L1-LN, although for purposes of clarity all are not shown. The second category field 1112 is labeled as "Comedy" and has three thumbnail images C1-C3 wholly or partially visible in the second scrollable field 1122. The total number of thumbnail images in the second scrollable field 1122 is C1-CN, although for purposes of clarity all are not shown. The third category field 1114 is labeled as "Horror" and has three thumbnail images H1-H3 wholly or partially visible in the third scrollable field 1124. The total number of thumbnail images in the third scrollable field 1124 is H1-H50, although for purposes of clarity all are not shown. The fourth category field 1116 is labeled as "Action" and has three thumbnail images A1-A3 wholly or partially visible in the fourth scrollable field 1126. The total number of thumbnail images in the fourth scrollable field 1126 is A1-AN, although for purposes of clarity all are not shown. In this example, the user is interested in importing all the movies listed in each of the categories, with the goal of selecting a horror movie to watch.

Using the AR head-mounted display, the user may initiate scroll mode to import the thumbnail images L1-LN, C1-CN, H1-H50, and A1-AN (the device content elements in this example) from all scrollable fields 1120-1126 from the display screen 1104 into the AR environment to be displayed as AR content elements on the AR display. After all the thumbnail images L1-LN from the My List category and the thumbnail images C1-CN from the Comedy category are imported into the AR environment, the AR display may display the partially imported AR content elements 1130, which includes all the thumbnail images L1-LN and C1-CN, and wholly or partially three thumbnail images H1-H3 and A1-A3 in each of the Horror and Action categories. This partially imported view 1130 of the AR content elements 1108 is an intermediate stage of the importation process. Once all four categories 1110-1116 of the thumbnail images L1-LN, C1-CN, H1-H50, and A1-AN have been imported, the AR display may display a fully imported view of AR content elements 1108. However, in this example, after the AR content elements 1108 from all four categories 1152-1158 are imported, the user may select a first view 1150 of the AR content elements 1108 that shows only the thumbnail images H1-H50 from the horror category on the AR display. From the displayed thumbnail images H1-H50, the user may identify a horror movie to watch on the display screen 1104 using processes disclosed herein. Once the user has made a selection of a horror movie from the first view 1150, the AR environment may, using processes disclosed here, guide the user to select the corresponding horror movie on the display screen 1104 so that the user may watch the selected movie on the display screen 1104.

Figure 12:
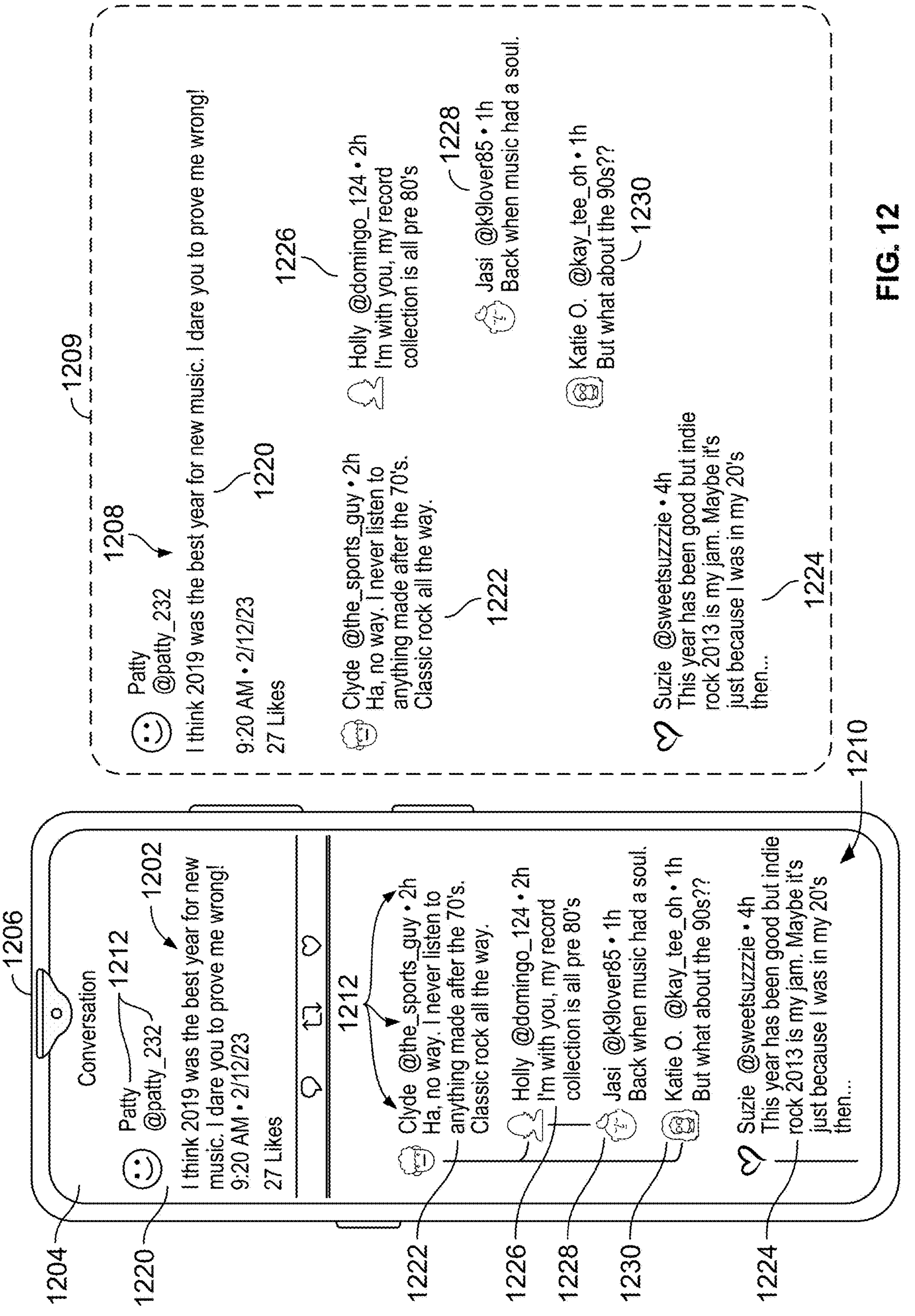
FIG. 12 illustrates the AR environment altering arrangement of content elements imported from a scrollable field having nested content elements.

FIG. 12 illustrates the importation of device content elements 1202 in the form of social media conversations displayed on the display screen 1204 of a user device 1206, shown here as a smartphone, and the subsequent display of the corresponding AR content elements 1208 on an AR display 1209. In this example, the user device 1206 is displaying the device content elements 1202 on the display screen 1204, and the device content elements 1202 are included as part of a social media conversation, which forms the scrollable field in this example. For purposes of clarity in this example, the device content elements 1202 shown as imported into the AR environment are only those displayed on the display screen 1204. It should be understood that the social media conversation is displayed within a scrollable field 1210 on the display screen 1204 and includes more device content elements 1202 than are shown in FIG. 12. During importation, the XR framework analyzes and interprets each device content element 1202 (each statement/comment within the social media conversation), including each context element 1212 (e.g., user name, user identifier, time of comment, etc.) within each device content element 1202. In addition, since the social media conversation displayed on the display screen 1204 graphically displays the nesting structure and relationships of each social media post (e.g., threads including an original post, reply posts, reposts, responses, quote posts, etc.), the XR framework may determine the nesting relationships between the various social media posts and generate metadata to associate with the AR content elements 1208 so that the nesting relationship may be displayed within the AR environment. In this example, the device content elements 1202 are shown as a nested conversation which includes a first level comment 1220, two second level comments 1222, 1224 nested under the first level comment 1220, and three third level comments 1226, 1228, 1230 nested under the second level comment 1222. Following importation of the device content elements 1202, and using the metadata generated at the time of import, the AR environment may display the nesting structure of the social media conversation using an arrangement that is different from the nesting arrangement presented on the display screen 1204. The AR content elements 1208 may displayed to emphasize the nesting, with the first level comment 1220 positioned above other nested comments, the second level comments 1222, 1224 on the left side, and the third level comments 1226, 1228, 1230 to the right of the associated second level comment 1222. Other arrangements for displaying AR content elements that are based on imported social media conversations, or other types of nested content, may also be used.

In some embodiments, the XR framework may display nested AR content elements in the AR environment with lower nested AR content elements arranged along a z-axis. Using such an arrangement for the AR content elements introduces depth of field to the display of the content elements and may aid the user in reviewing or analyzing the AR content elements. For example, a second response to a first response in a conversation may be presented at a greater depth than the first response. In some embodiments, loser nested AR content elements may be initially hidden from view within the AR environment, with a graphical indicator added to indicate that hidden nested AR content elements are present and may be displayed upon receiving further user input that the hidden nested AR content elements should be displayed.

In some embodiments, the XR framework may display the AR content elements in an arrangement that is different from the arrangement of the corresponding XR content elements on the display screen. For example, while the imported device content elements from a social media conversation may have a vertically oriented arrangement on the display screen, the AR content elements have a horizontally oriented arrangement on the AR display. As another example, the AR content elements may be presented in a 2D or 3D arrangement on the AR display. The arrangement of the AR content elements on the AR display is intended to be non-limiting.

In some embodiments, nested device content elements may be imported in two or more stages. For example, in a first stage, the user may activate scroll mode for importing social media conversations while only the top-level comments are visible. During this first activation of scroll mode, the XR framework imports the top-level comments into the AR environment. After importing the top-level comments, the user may decide to also import lower-level comments. To accomplish this, the user makes the lower-level comments visible on the display screen and then activates a scroll mode for a second time, this time selecting an option within the AR environment that additional information is to be imported and added to the previous import. During this second import, the XR framework recognizes that the top-level comments are duplicates, and therefore does not re-import the top-level comments. Also, the XR framework imports the now-visible lower-level comments and recognizing the nesting structure of the social media conversation, generates metadata to reflect that nesting structure.

In some embodiments, the XR framework may identify a network domain associated with the device content elements during the importation and analysis process, and through accessing the network domain, or an accessible application programming interface (API) associated with the domain, the XR framework may obtain detailed information concerning the structure of the device content elements, individually or as a whole. Such detailed information may relate to the underlying structure of the device content elements, including context elements, the spatial arrangement of the device content elements within the scrollable field, or both. The detailed information may assist in the analysis of the device content elements or in displaying the corresponding AR content elements to the user in the AR environment, including interpreting keys for sorting, filtering, and/or re-arranging context elements or the AR content elements themselves.

Figure 13:
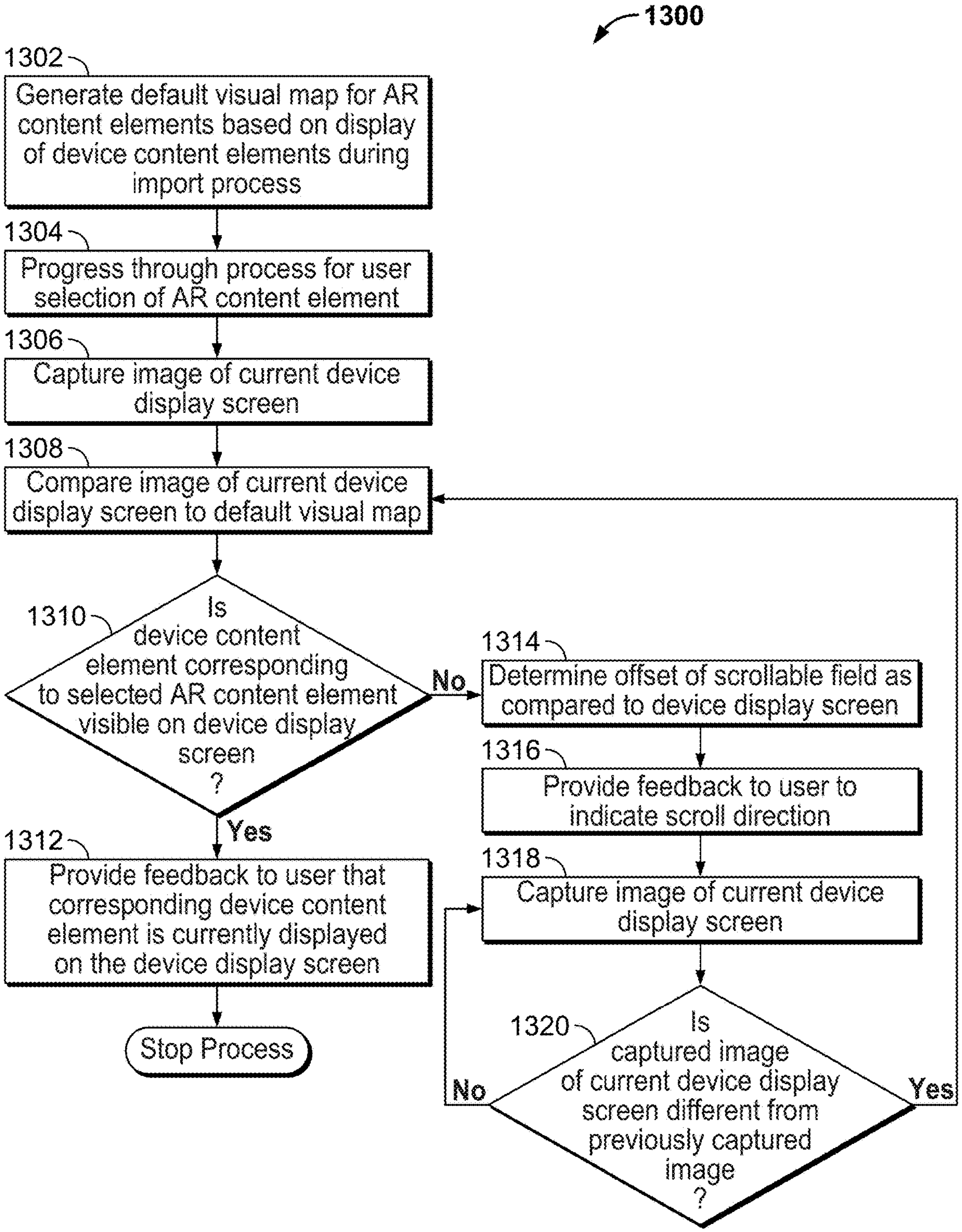
FIG. 13 shows a flowchart of illustrative steps involved in an AR environment guiding a user to locate and select a content element on the display device, the content element identified by the user within the AR environment.
Figure 14:
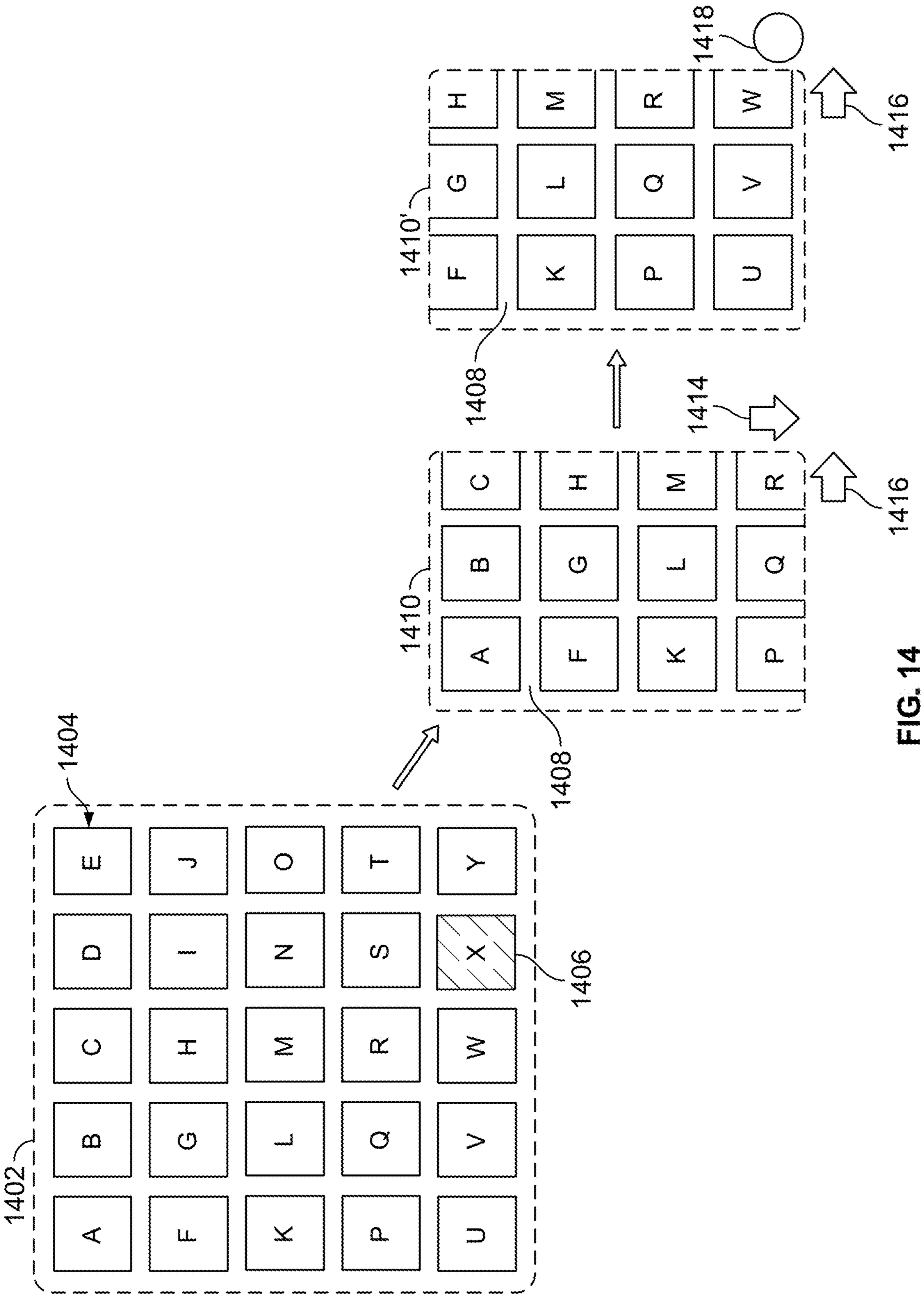
FIG. 14 graphically illustrates the AR environment guiding the user to locate and select a content element on the display device, the content element identified by the user within the AR environment.

FIG. 13 shows a flowchart illustrating the steps of a process 1300 for the AR environment guiding a user to locate and select a device content element on the user device after the user has identified the corresponding AR content element within the AR environment. In connection with this process 1300, FIG. 14 schematically illustrates portions of the process 1300. The process 1300 may be implemented on the XR framework discussed herein and similar systems for generating, controlling, and displaying an AR environment, including an AR head-mounted display. One or more actions of the process may be incorporated into or combined with one or more actions of any other process or embodiments described herein. At step 1302, during the process of importing the device content elements, the XR framework generates a default visual map for AR content elements based on the display of device content elements on the device display. An example of a default visual map 1402 showing AR content elements 1404, labeled A-Y, is shown in FIG. 14, which is also referenced in the following description. This default visual map 1402 is used later in the process 1300 to guide the user in selecting a device content element on the user device following selection of a corresponding AR content element 1406 within the AR environment. In FIG. 14, the default visual map 1402 mirrors all the device content elements that are included in the scrollable field 1408 on the display screen 1410 of the user device 1412. Using the default visual map 1402, the XR framework may determine where any device content element is within the scrollable field 1408, according to scroll direction, by comparing the current state of the scrollable field 1408 on the display screen 1410 with the default visual map 1402.

At step 1304, the process 1300 progresses through the portion of the process 500 (see FIG. 5) that enables a user to select an AR content element. At step 1306, the AR head-mounted display captures an image of the current display screen, and at step 1308, the captured image is compared to the default visual map 1402. At step 1310, the XR framework determines if the device content element corresponding to the selected AR content element 1406 is visible in the image of the current display screen. If the XR framework determines that the corresponding device content element is visible on the current image of the display screen, then at step 1312 the XR framework provides feedback to the user indicating that the corresponding device content element is currently displayed on the display screen. If the XR framework determines that the corresponding device content element is visible on the current image of the display screen, the XR framework stops the process 1300, and the AR environment may display an indicator which highlights the position of the corresponding device content element to the user so that the user may make the selection directly on the user device. If the XR framework determines that the corresponding device content element is not visible on the current image of the display screen, then at step 1314 the XR framework determines an offset for the scrollable field 1408 based on the current image of the display screen and the position of the corresponding device content element in the scrollable field 1408.

At step 1316, the XR framework provides feedback to the user indicating that the corresponding device content element is not currently displayed on the display screen. As part of this step 1316, the AR environment may display scroll indicators 1414, 1416 to the user to indicate a direction of scroll to bring the corresponding device content element onto the display screen. In this example, the scroll indicators 1414, 1416 are arrows which indicate to the user the direction for scrolling the scrollable field 1408. Since the scrollable field 1408 is two-dimensional, a scroll indicator 1414, 1416 is displayed for each scroll direction. As the user scrolls and the view on the display screen 1410' changes, when sufficient scrolling has been performed in at least one of the scroll directions, the scroll indicator 1414 for that direction may be changed to a stop scrolling indicator 1418. The stop scrolling indicator 1418 informs the user that no further scrolling needs to be performed in that direction. In some embodiments, the scroll indicators may take other visual forms other than arrows. In some embodiments, the scroll indicators may be audible cues provided as feedback to the user. In some embodiments, the scroll indicators may be in the form of haptic feedback provided to the user. The form and nature of the scroll indicators is intended to be non-limiting.

As the user continues to scroll in response to being provided feedback at step 1316, at step 1318, the XR head-mounted display captures a current image of the display screen. At step 1320, the framework compares the image captured in step 1318 with the immediately preceding captured image of the device display to determine if the display screen is different between the images. A difference between successive images indicates that the scrollable field 1408 has been scrolled by the user, whereas if there is no difference, the user may not have scrolled the scrollable field yet. If the user has scrolled the scrollable field as determined in step 1320, the process 1300 returns to step 1308. If the user has not scrolled the scrollable field as determined in step 1320, the process 1300 returns to step 1318. In some embodiments, the process 1300 may include a timeout in case the process becomes stuck in a loop between step 1318 and step 1320.

In some embodiments when a content image of the display screen or scrollable field is captured while the user scrolls the scrollable field, the user's finger, thumb, and/or shadow is also captured within the boundaries of the content image, the XR framework may use image segmentation and object removal algorithms and techniques to identify and remove the unwanted interference from the user's finger, thumb, and/or shadow. To increase the ability of the XR framework to remove the unwanted interference, increased image capture rates may be used. The increased image capture rates may result in increased content image redundancy and a better ability to construct a content image that accurately reflects the display screen at the time the content image is captured. This also increases the ability to accurately capture device content elements and associated context elements. Such processing may be performed by the XR framework after the initial image segmentation to obtain an image of the display screen without the surrounding background and before the secondary image segmentation to separately identify device content elements and the associated context elements.

In some embodiments, the visual presentation of the AR content elements in the AR environment may be spatially anchored to a certain location within the user's surroundings. In some embodiments, the visual presentation of the AR content elements in the AR environment may be floating, such that the AR content elements are anchored to a position within the user's field of view. In instances when the position of the AR content elements is floating, the AR content elements may hinder the user's ability to view the display screen. To avoid this, a grid (not visible to the user) may be constructed, and the position of the user device within the user's field of view may be defined by a bounding box within the grid. The XR framework may include a rule that the AR content elements on the AR display may not enter the defined bounding box, and if the AR content elements are close to the bounding box, the AR content elements are moved along x and/or y axes at a fixed depth to prevent interference between the AR content elements and the display screen. In some embodiments, the XR framework may adjust the projection depth of the AR content elements so that the AR content elements appear to pass behind the display screen within the AR environment.

In some embodiments, as part of initiating scroll mode, the user may provide input (e.g., through a voice command) to the XR framework indicating that the user is searching for a content element with a particular context element (e.g., a movie with a specific title) on the user device. When the user begins scrolling on the user device, the user may scroll quickly, during which the AR head-mounted display captures and analyzes content elements and context elements searching for the particular context element (e.g., the movie title). As soon as the XR framework detects the particular context element, scroll mode is automatically terminated, the user is alerted that the context element has been detected, and the process switches to guiding mode to direct the user to the content element that includes the detected context element. Thus, the AR head-mounted display may facilitate the user's ability to scroll to locate a pre-selected item in a large group of device content elements.

In some embodiments, the user may select an item from a sorted, filtered, and/or rearranged group of AR content elements. The XR framework may maintain an original visual of the imported group of AR content elements in the original order and arrangement that matches the order and arrangement of the device content elements on the display screen. When the user selects one of the AR content elements, the original visual may be displayed to facilitate guiding the user to select the corresponding device content element on the display screen.

In some embodiments, the visual of the AR content elements may be saved in an extensible markup language (XML) format (or other similar markup language) rather than as an image. The XR framework, through identification of recurring visual elements and patter, may convert the visual of the AR content elements into an XML file while storing only the non-recurring elements. By converting the visual of the AR content elements into an XML or similar format, the XR framework may reduce both communication bandwidth and storage space needed for processing, displaying, and transmitting the AR content elements.

In some embodiments, the XR framework may import device content elements that include video clips (e.g., video thumbnails, embedded videos in a social media feed etc.) or other images that may be subject to change (e.g., animated GIFs). During the import process, the XR framework may detect the nature of the video or changing image and generate metadata to indicating the presence of the video/changing image within the scrollable field. When scroll mode is terminated, the XR framework may provide feedback to the user to indicate the presence of the video or changing image. The user may then scroll to (or be guided to scroll to) the video or changing image, and if it is part of a device content element, the XR framework may import other features and attributes surrounding the video or changeable image to generate an AR content element from the associated features and attributes.

The processes and systems described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of importing content into an extended reality environment, the method comprising:

connecting, via input/output circuitry using control circuitry, an extended reality display to the extended reality environment, the control circuitry communicably coupled to the extended reality display, the input/output circuitry, and an image sensor;

receiving, via the input/output circuitry, instructions to import into the extended reality environment a plurality of device content elements from a display screen of a display device, wherein the display device displays the plurality of device content elements in a scrollable field on the display screen, the scrollable field configured to display a subset of the plurality of device content elements on the display screen;

capturing, using the image sensor, a plurality of content images of the display screen while the scrollable field is scrolled based at least in part on receiving scrolling input via a user interface of the display device to display the plurality of device content elements;

analyzing, using the control circuitry, the captured content images to identify a plurality of extended reality content elements in the captured content images, each of the extended reality content elements corresponding to one of the device content elements; and displaying, using the extended reality display, the extended reality content elements within the extended reality environment in an extended reality display arrangement, the extended reality display arrangement being different than a device display arrangement of the device content elements on the display screen.

2. The method of claim 1, further comprising receiving, via the input/output circuitry, arrangement input from a user, the extended reality display arrangement being based on the arrangement input.

3. The method of claim 2, wherein displaying the extended reality content elements comprises displaying the extended reality content elements in a first order using the extended reality display, the device content elements being displayed in a second order within the scrollable field on the display screen of the display device, the first order being different from the second order.

4. The method of claim 3, wherein each of the extended reality content elements comprises a context element, and the second order is based on sorting of the context elements.

5. The method of claim 4, further comprising identifying a common image feature from the captured device content elements, wherein each context element is based on the common image feature.

6. The method of claim 5, wherein the common image feature comprises a common textual feature.

7. The method of claim 5, wherein the common image feature comprises a common graphical feature.

8. The method of claim 3, further comprising receiving sorting input from the user, via the extended reality environment, the second order being based on the sorting input.

9. The method of claim 1, wherein analyzing the captured content images further comprises performing image analysis on each extended reality content element.

10. The method of claim 9, wherein performing the image analysis further comprises performing optical character recognition of textual features included with each extended reality content element.

11. The method of claim 9, wherein performing the image analysis further comprises identifying a common image feature in the extended reality content elements and associating values with the common image feature in each extended reality content element.

12. The method of claim 1, wherein capturing the plurality of device content images comprises adjusting a capture frame rate based on a scroll rate of the scrollable field.

13. The method of claim 1, wherein the analyzing the captured content images and the displaying the plurality of extended reality content elements is performed while capturing the plurality of content images.

14. The method of claim 1, further comprising:

storing a first sort order of the device content elements in storage of an extended reality head-mounted device;

receiving, via the input/output circuitry, an input selecting a first extended reality content element from among the extended reality content elements displayed using the extended reality display;

capturing a screen image of the scrollable field displayed on the display screen of the display device;

determining, based on the captured screen image and the stored first sort order, a position of a first device content element among the device content elements within the scrollable field, the first device content element corresponding to the first extended reality content element; and instructing a user where to locate the first device content element within the scrollable field on the display screen.

15. An extended reality device, comprising:

input/output circuitry;

an extended reality display;

an image sensor; and control circuitry configured to:

connect, via the input/output circuitry, the extended reality display to an extended reality environment;

receive, via the input/output circuitry, instructions to import into the extended reality environment a plurality of device content elements from a display screen of a display device, wherein the display device displays the plurality of device content elements in a scrollable field on the display screen, the scrollable field configured to display a subset of the plurality of device content elements on the display screen;

capture, using the image sensor, a plurality of content images of the display screen while the scrollable field is scrolled based at least in part on receiving scrolling input via a user interface of the display device to display the plurality of device content elements;

analyze the captured content images to identify a plurality of extended reality content elements in the captured content images, each of the extended reality content elements corresponding to one of the device content elements; and display, using the extended reality display, the extended reality content elements within the extended reality environment in an extended reality display arrangement, the extended reality display arrangement being different than a device display arrangement of the device content elements on the display screen.

16. The device of claim 15, the control circuitry further configured to receive, via the input/output circuitry, arrangement input from a user, the extended reality display arrangement being based on the arrangement input.

17. The device of claim 16, wherein the control circuitry is configured to display the extended reality content elements in a first order using the extended reality display, the device content elements being displayed in a second order within the scrollable field on the display screen of the display device, the first order being different from the second order.

18. A non-transitory, computer-readable medium having instructions encoded thereon that when executed by control circuitry cause the control circuitry to:

connect, via input/output circuitry, an extended reality display to an extended reality environment;

receive, via the input/output circuitry, instructions to import into the extended reality environment a plurality of device content elements from a display screen of a display device, wherein the display device displays the plurality of device content elements in a scrollable field on the display screen, the scrollable field configured to display a subset of the plurality of device content elements on the display screen;

capture, using an image sensor, a plurality of content images of the display screen while the scrollable field is scrolled based at least in part on receiving scrolling input via a user interface of the display device to display the plurality of device content elements;

analyze the captured content images to identify a plurality of extended reality content elements in the captured content images, each of the extended reality content elements corresponding to one of the device content elements; and display, using the extended reality display, the extended reality content elements within the extended reality environment in an extended reality display arrangement, the extended reality display arrangement being different than a device display arrangement of the device content elements on the display screen.

19. The computer-readable medium of claim 18, wherein the instructions, when executed by the control circuitry, further cause the control circuitry to:

receive, via the input/output circuitry, arrangement input from a user, the extended reality display arrangement being based on the arrangement input.

20. The computer-readable medium of claim 18, wherein the instructions, when executed by the control circuitry, causes the control circuitry to display the extended reality content elements in a first order using the extended reality display, the device content elements being displayed in a second order within the scrollable field on the display screen of the display device, the first order being different from the second order.

* * * * *